Figure 1:
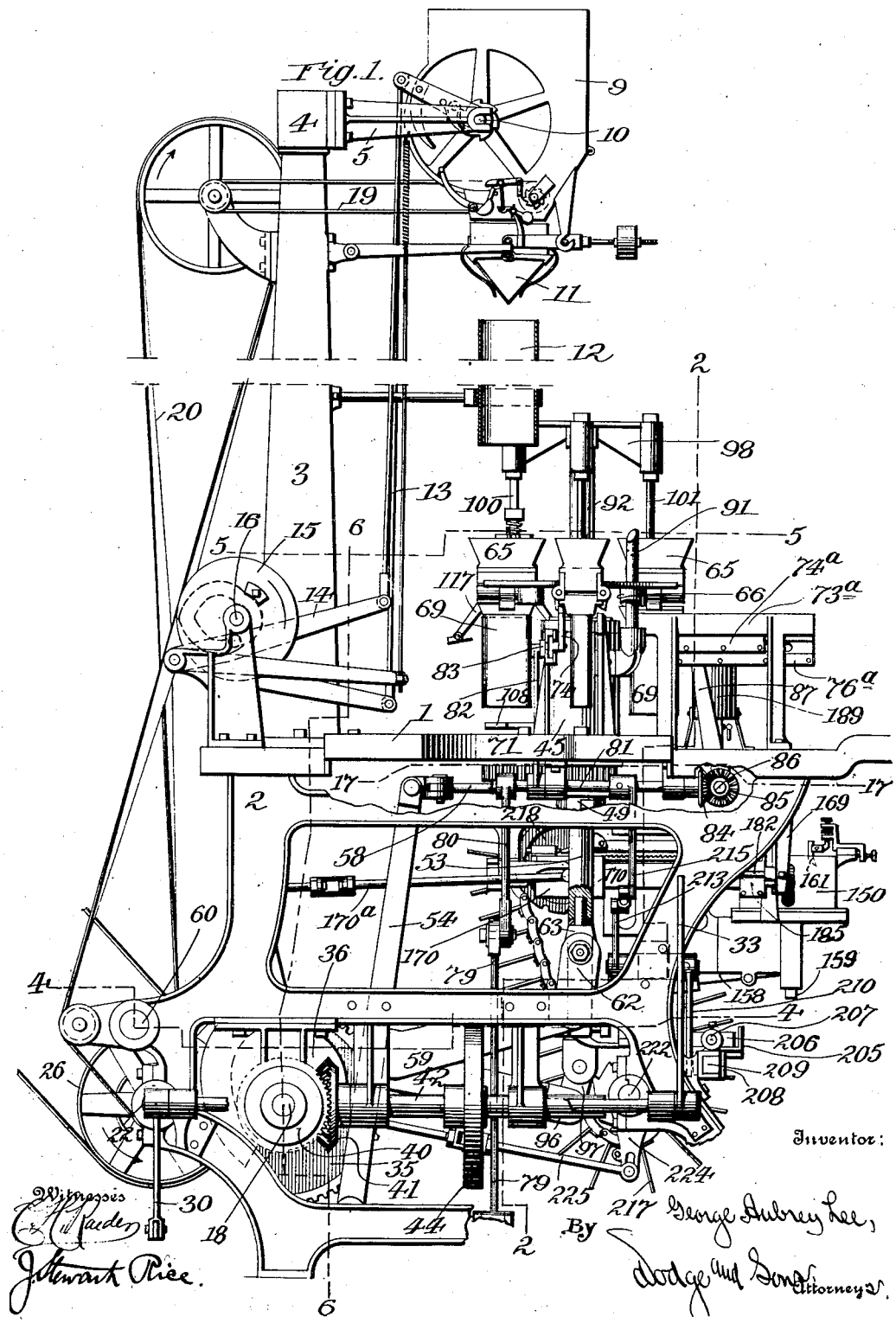

No. 872,521. PATENTED DEC. 3, 1907.
G. A. LEE.
MACHINE FOR PACKAGING MATERIALS.
APPLICATION FILED APR. 26, 1905.

13 SHEETS—SHEET 1.

Witnesses

Inventor:
George Aubrey Lee,
By Dodge and Son
Attorneys

No. 872,521. PATENTED DEC. 3, 1907.
G. A. LEE.
MACHINE FOR PACKAGING MATERIALS.
APPLICATION FILED APR. 26, 1905.
13 SHEETS—SHEET 2.
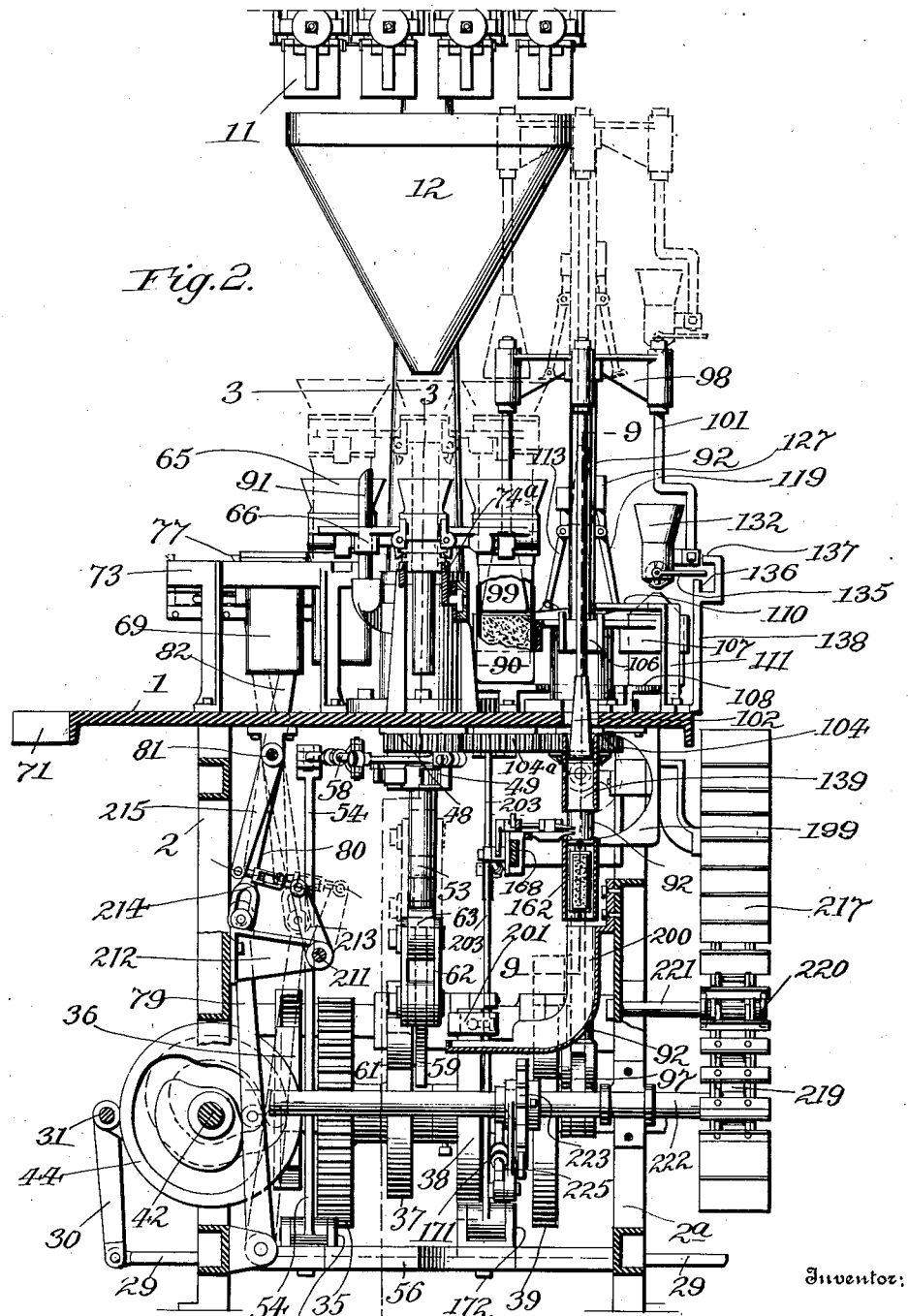

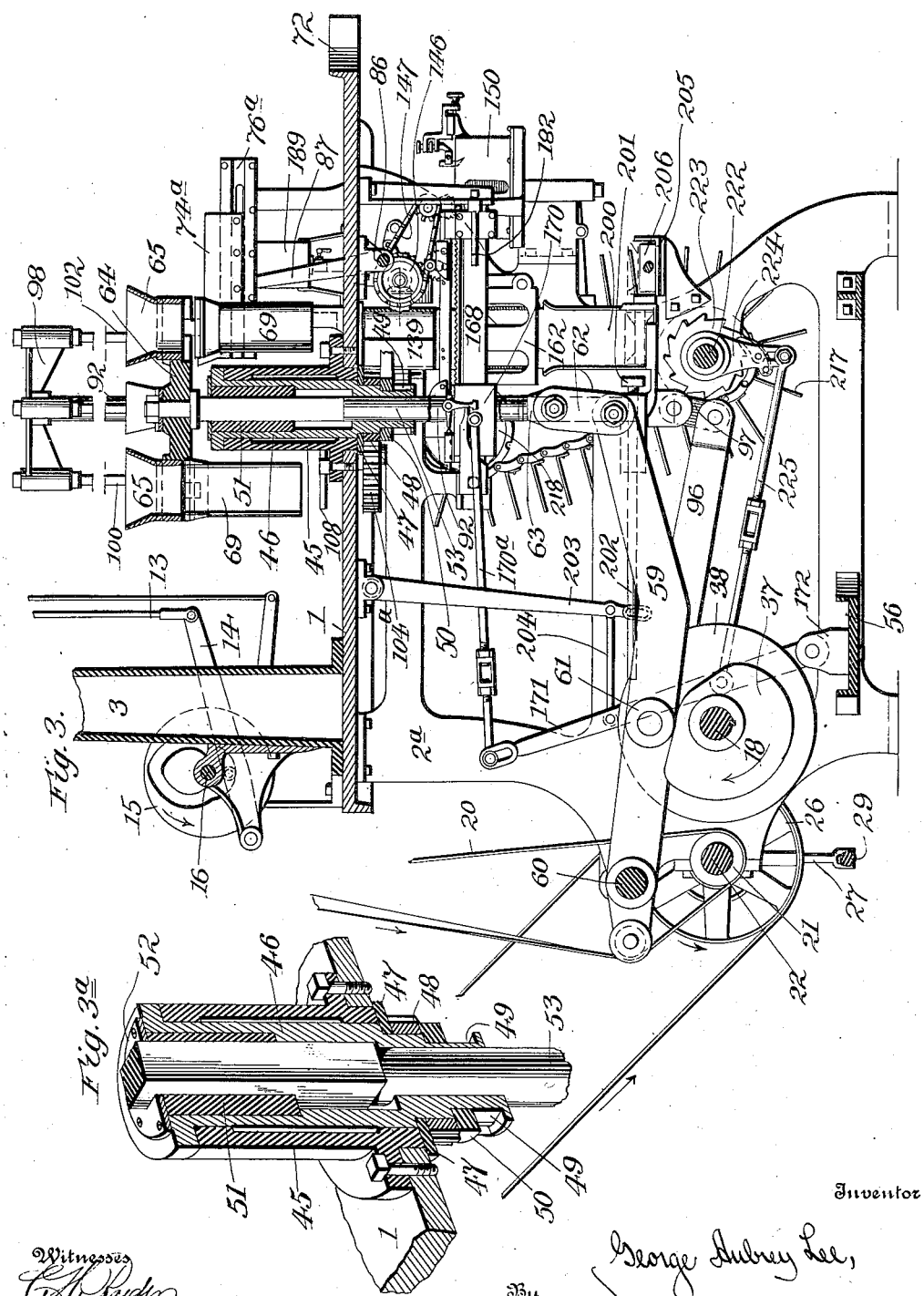

No. 872,521.
PATENTED DEC. 3, 1907.
G. A. LEE.
MACHINE FOR PACKAGING MATERIALS.
APPLICATION FILED APR. 26, 1905.
13 SHEETS—SHEET 4.
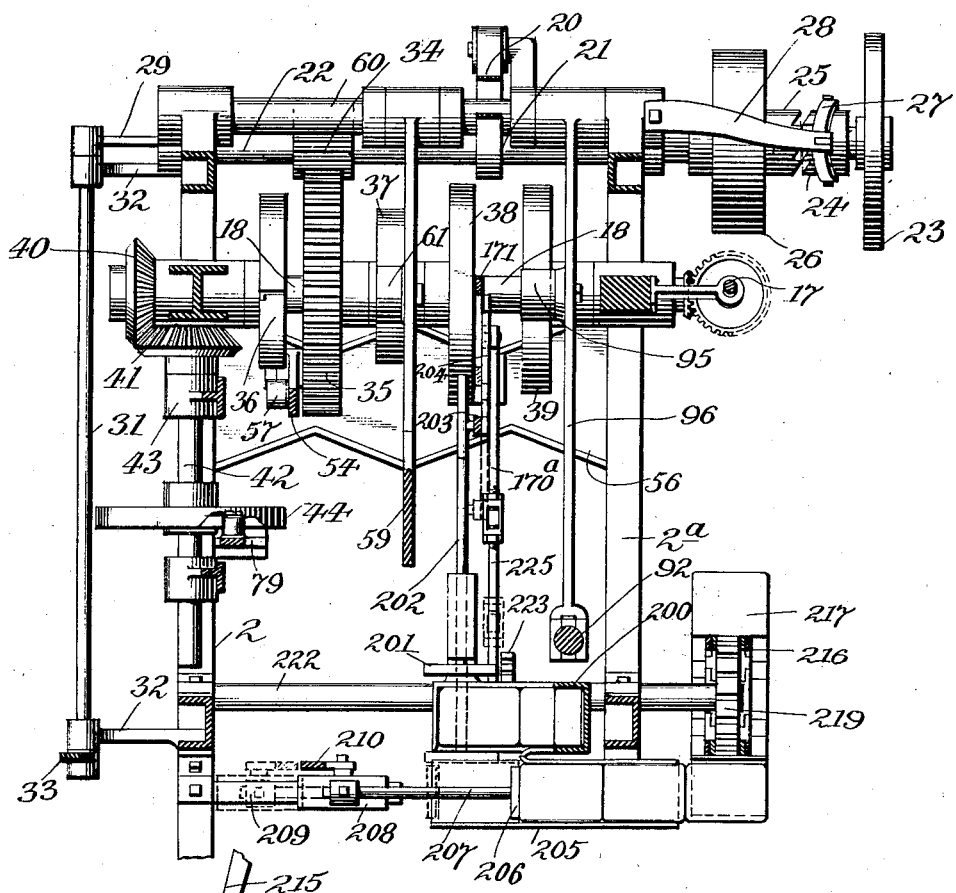
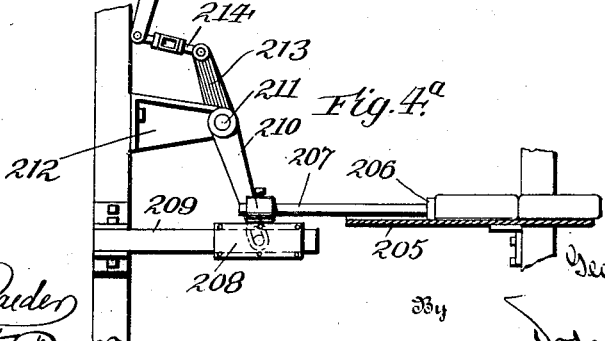

No. 872,521. PATENTED DEC. 3, 1907.
G. A. LEE.
MACHINE FOR PACKAGING MATERIALS.
APPLICATION FILED APR. 26, 1905.
13 SHEETS—SHEET 5.
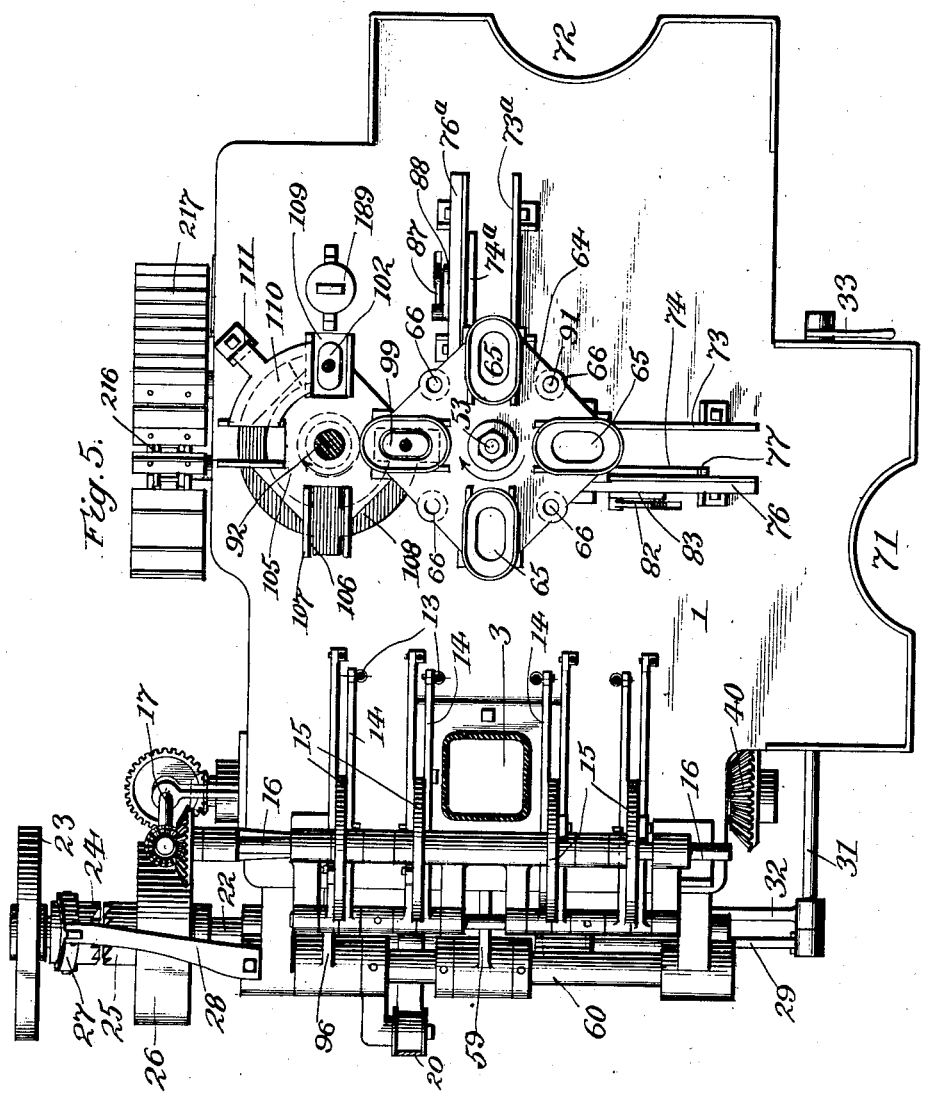

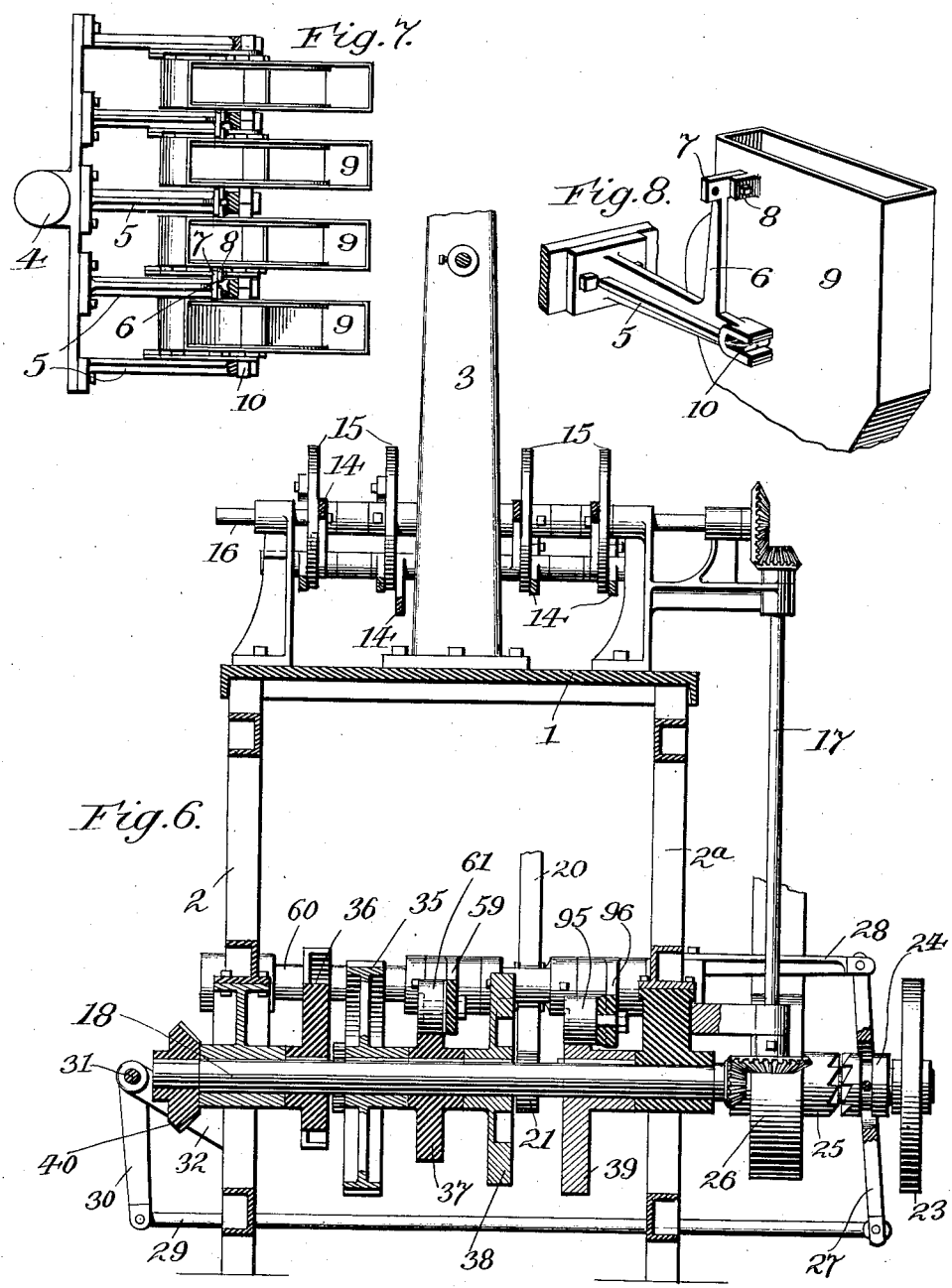

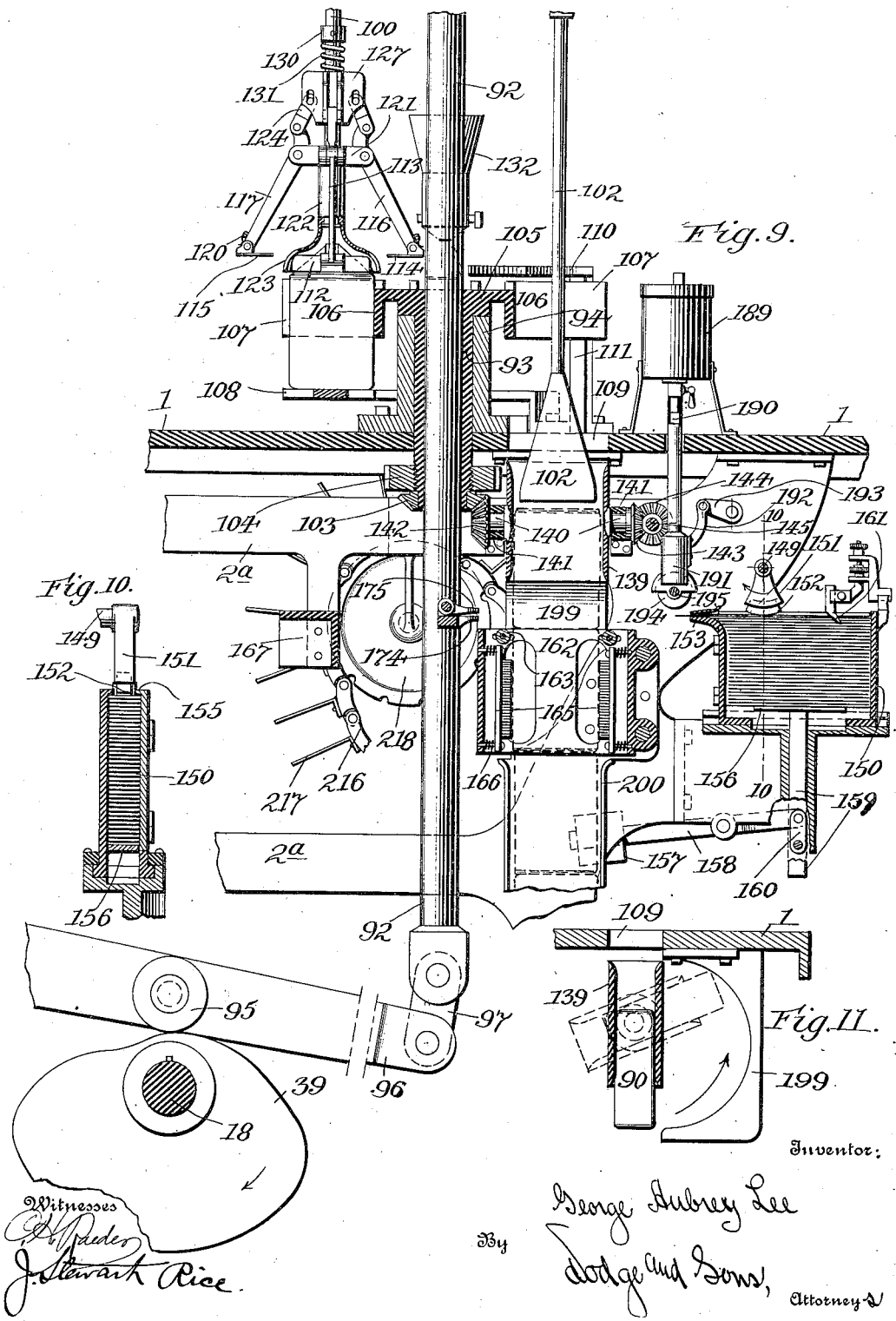

No. 872,521. PATENTED DEC. 3, 1907.
G. A. LEE.
MACHINE FOR PACKAGING MATERIALS.
APPLICATION FILED APR. 26, 1905.
13 SHEETS—SHEET 8.
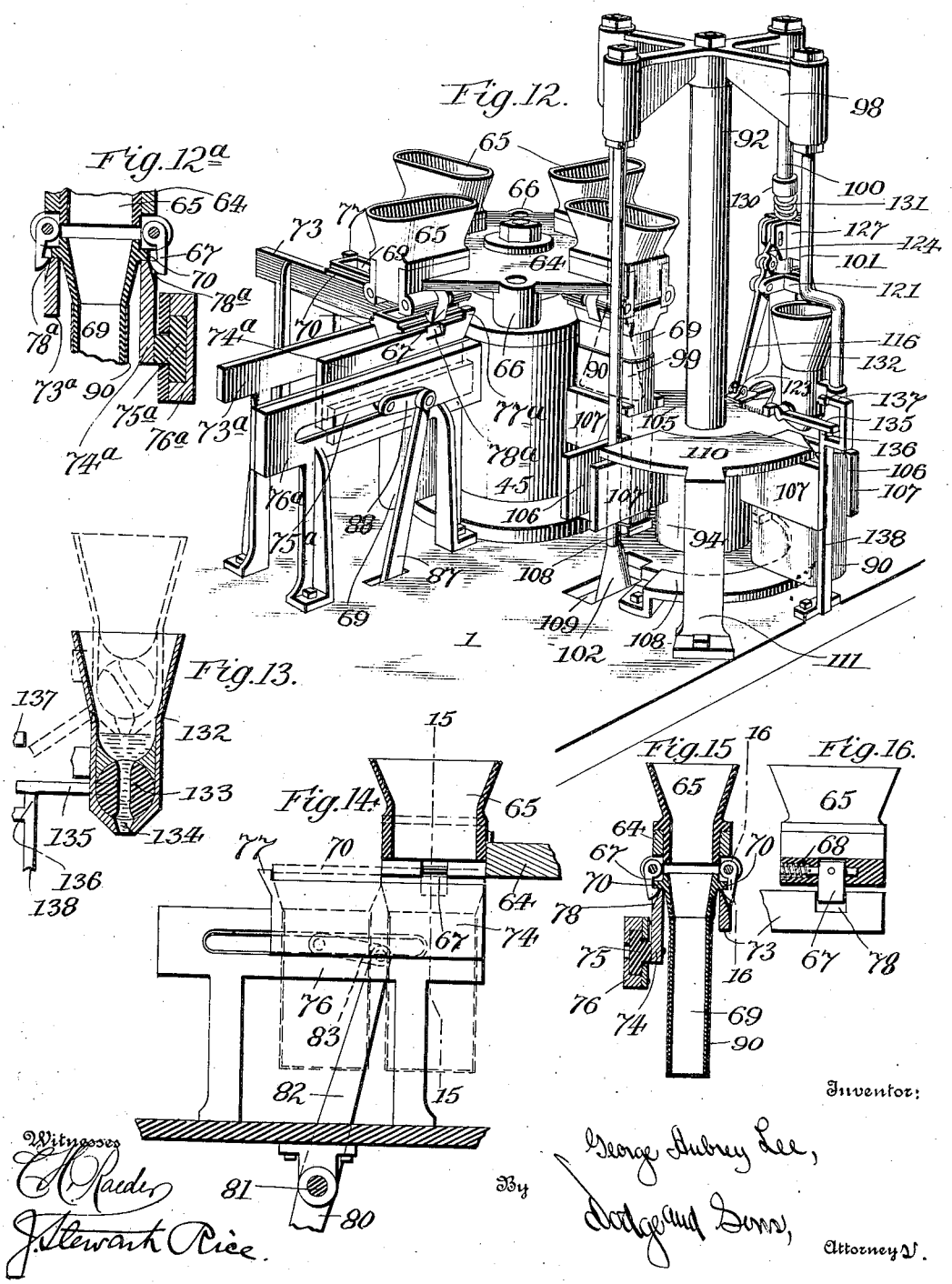

No. 872,521. PATENTED DEC. 3, 1907.
G. A. LEE.
MACHINE FOR PACKAGING MATERIALS.
APPLICATION FILED APR. 26, 1905.
13 SHEETS—SHEET 9.
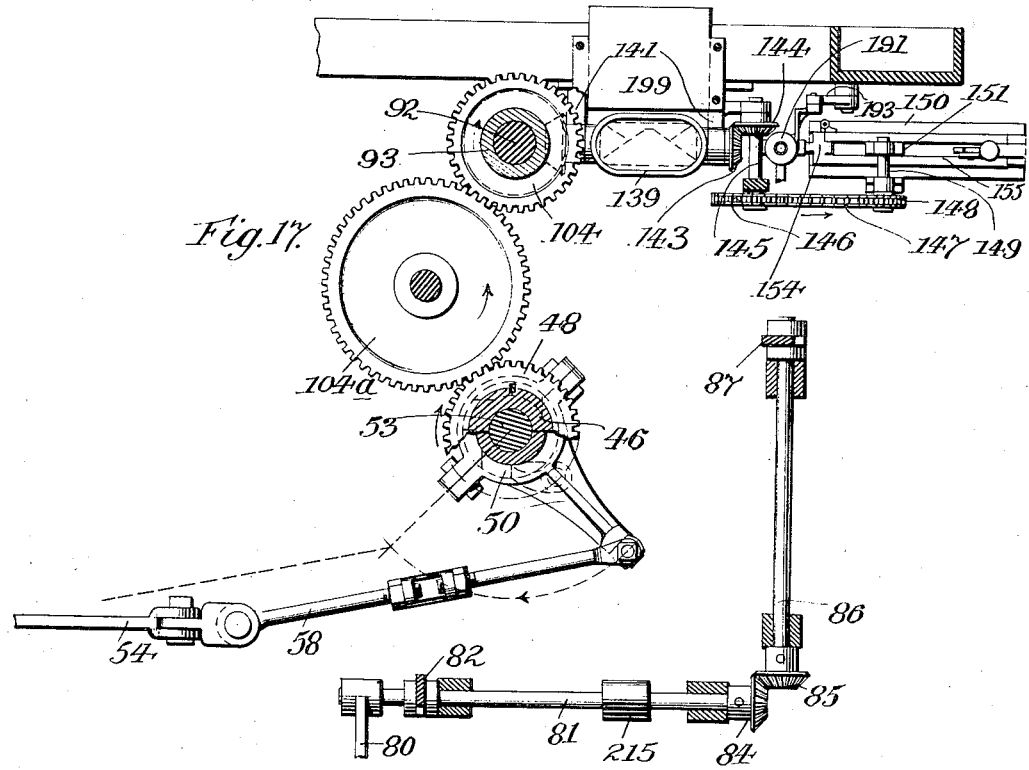
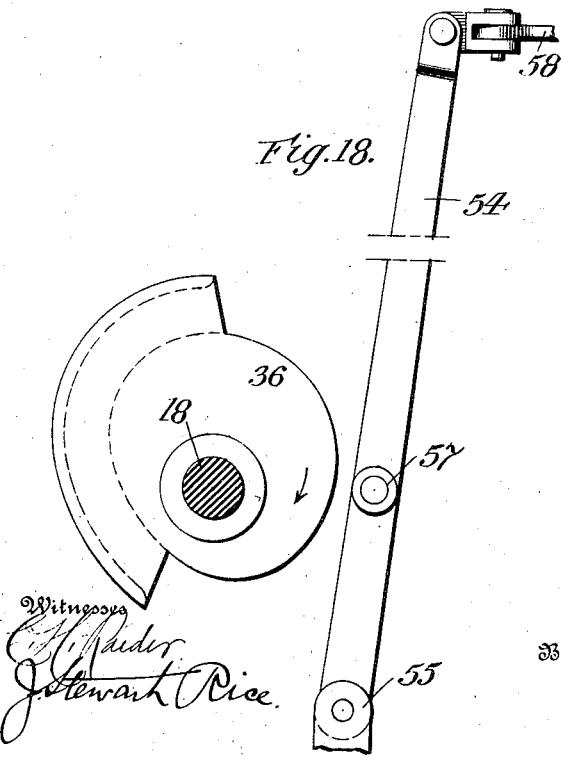
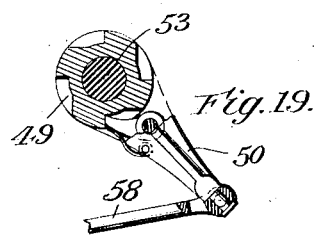
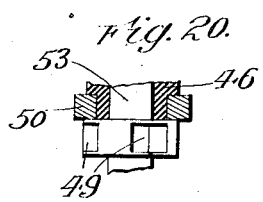

No. 872,521. PATENTED DEC. 3, 1907.
G. A. LEE.
MACHINE FOR PACKAGING MATERIALS.
APPLICATION FILED APR. 26, 1905.
13 SHEETS—SHEET 10.
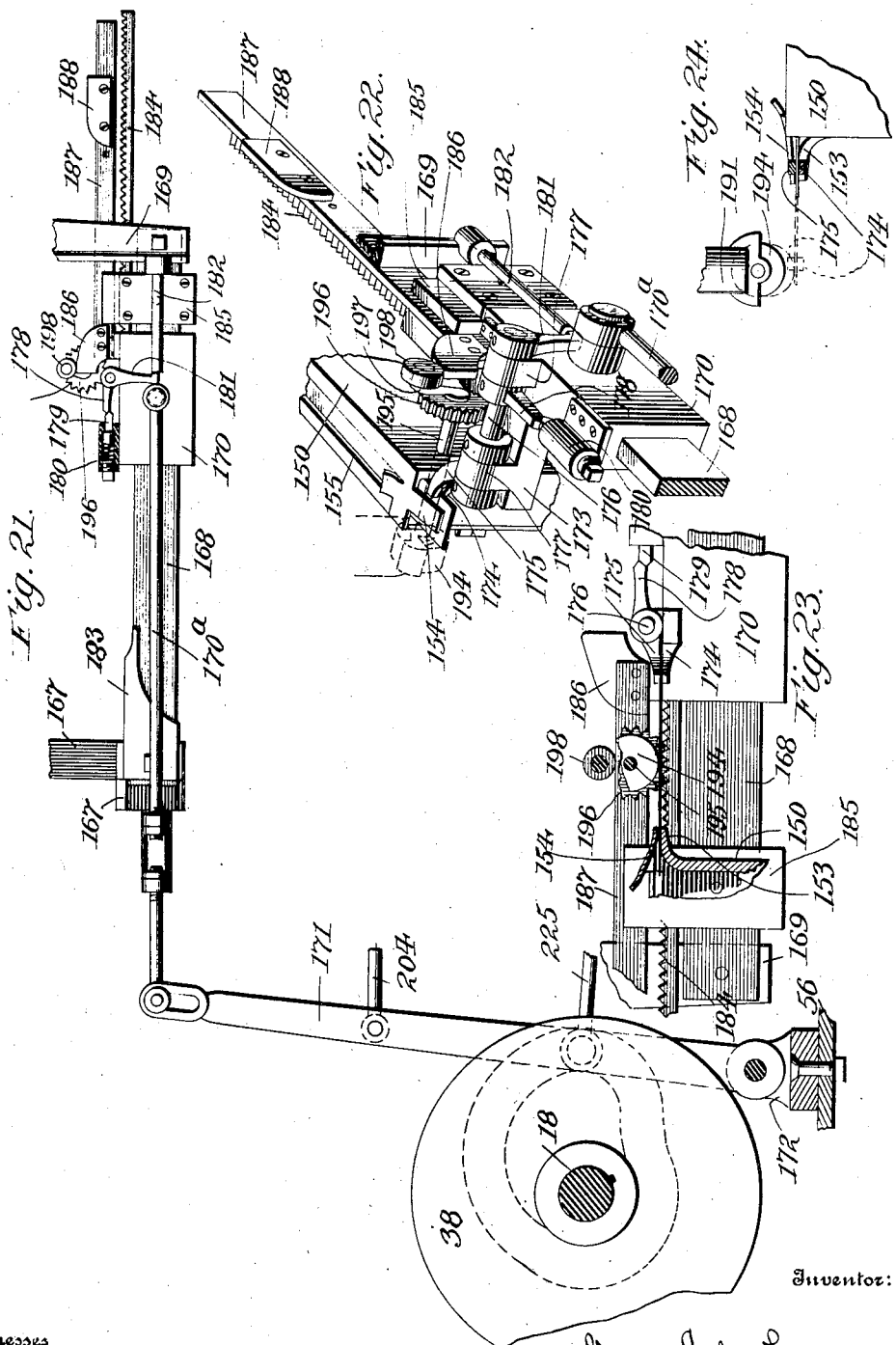
Witnesses
Inventor:
George Aubrey Lee,
By Dodge and Sons,
Attorneys No. 872,521. PATENTED DEC. 3, 1907.
G. A. LEE.
MACHINE FOR PACKAGING MATERIALS.
APPLICATION FILED APR. 26, 1905.
13 SHEETS—SHEET 11.
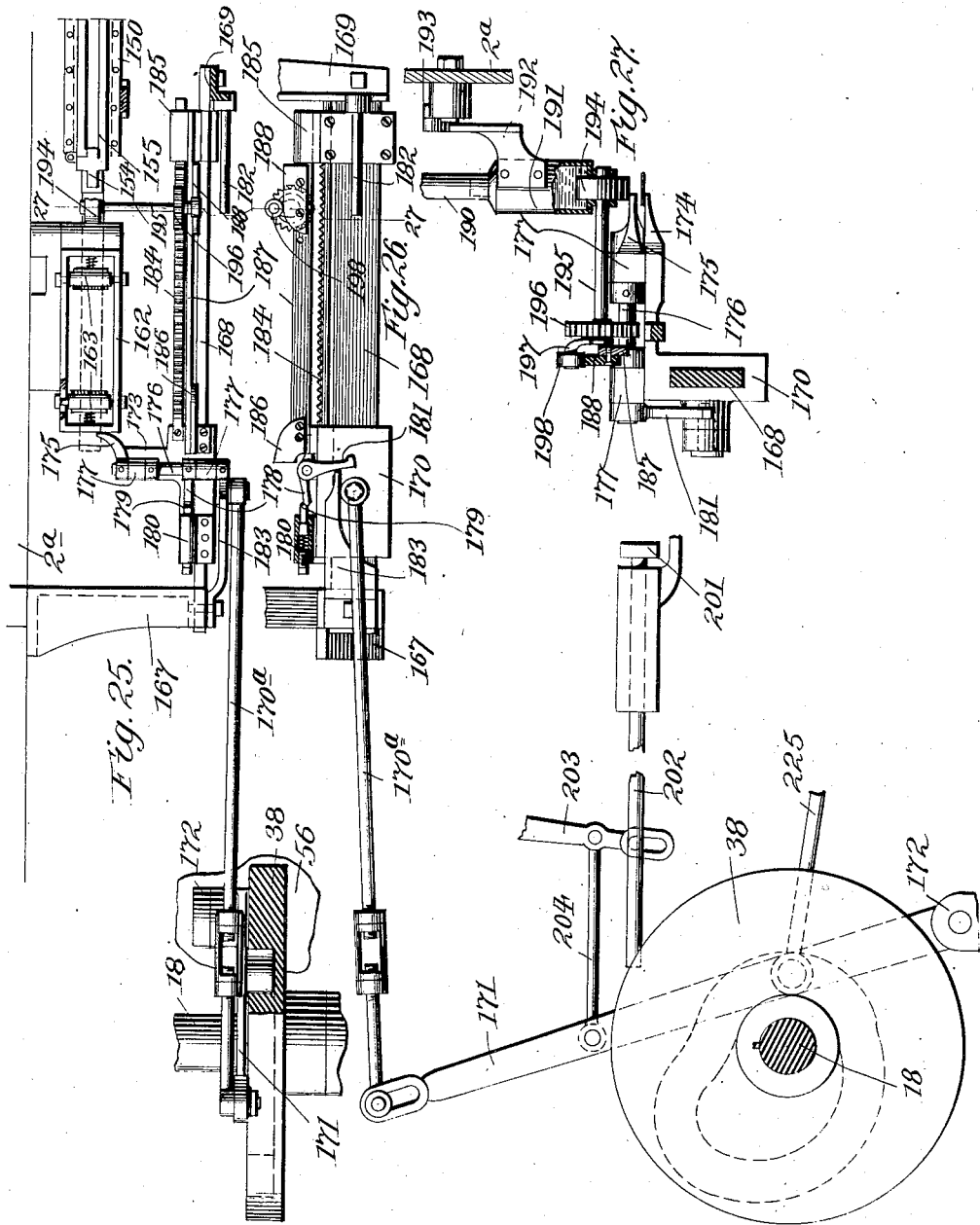

No. 872,521. PATENTED DEC. 3, 1907.
G. A. LEE.
MACHINE FOR PACKAGING MATERIALS.
APPLICATION FILED APR. 26, 1905.
13 SHEETS—SHEET 12.
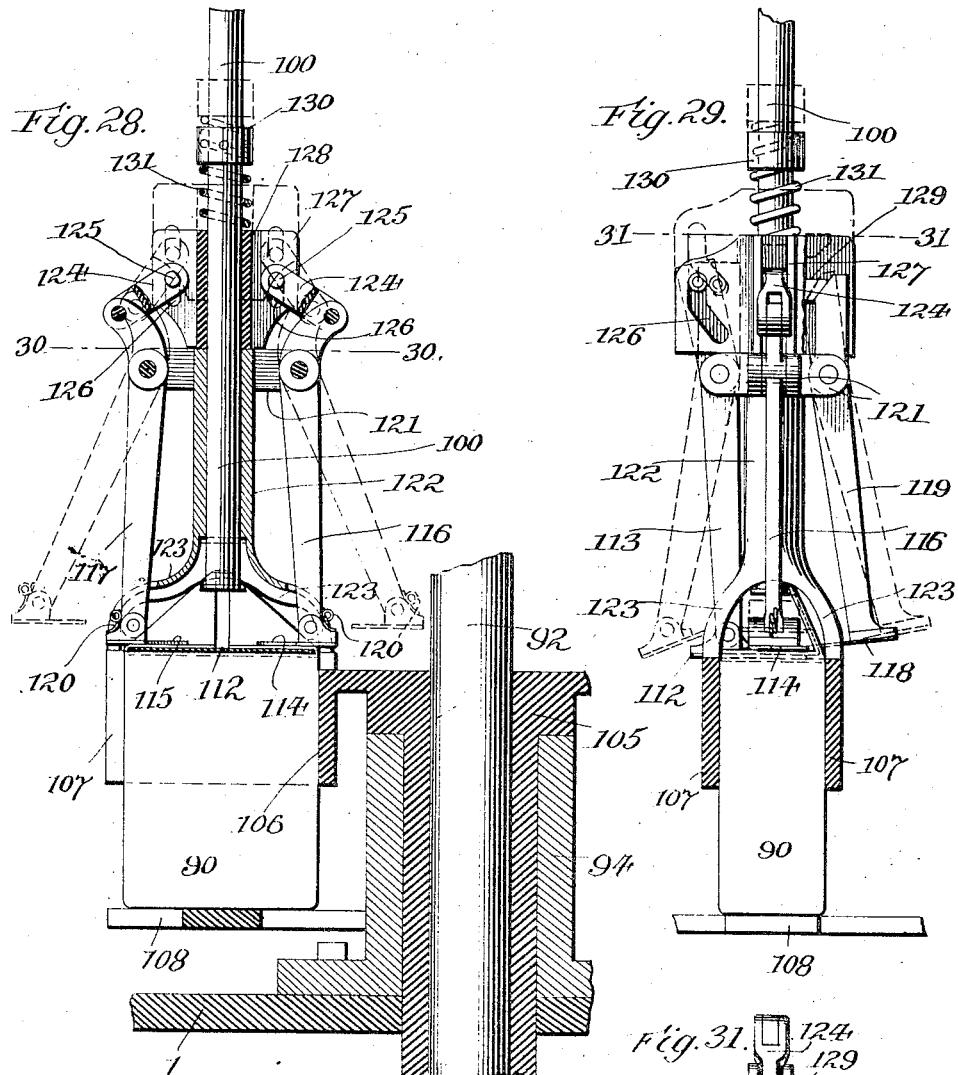
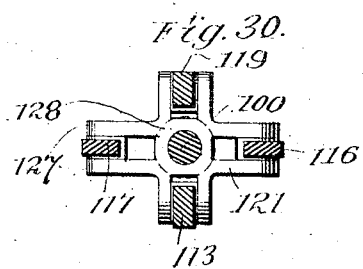

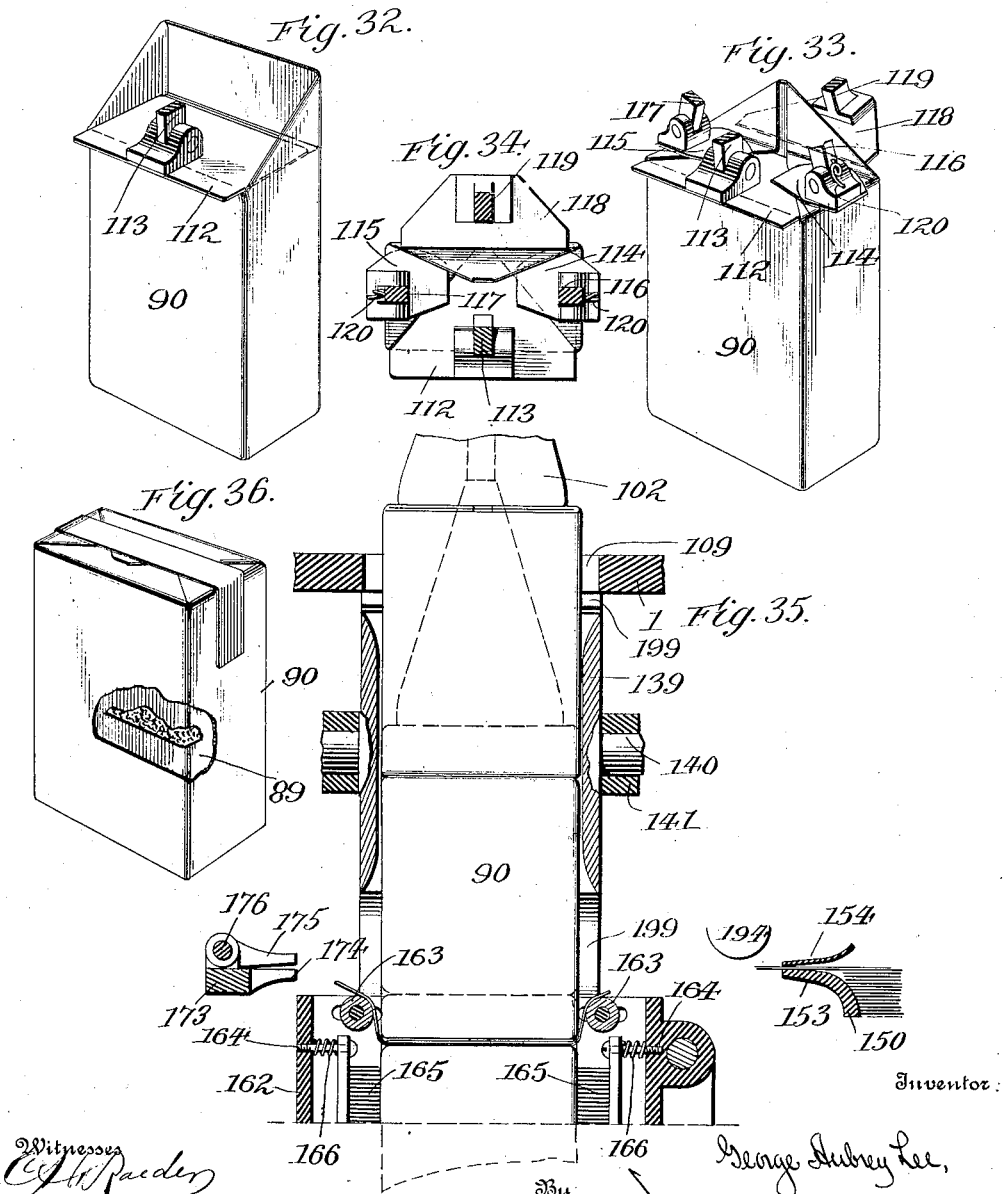

UNITED STATES PATENT OFFICE.

GEORGE AUBREY LEE, OF YONKERS, NEW YORK, ASSIGNOR TO AUTOMATIC PACKING & LABELING COMPANY, OF DURHAM, NORTH CAROLINA, A CORPORATION OF NORTH CAROLINA.

MACHINE FOR PACKAGING MATERIALS.

No. 872,521.      Specification of Letters Patent.      Patented Dec. 3, 1907.

Application filed April 26, 1905. Serial No. 257,511.

*To all whom it may concern:*

Be it known that I, GEORGE AUBREY LEE, a citizen of the United States, residing at Yonkers, in the county of Westchester and State of New York, have invented certain new and useful Improvements in Machines for Packaging Material, of which the following is a specification.

My present invention pertains to improvements in machines for packaging loose substances, particularly granular or flaky material such as tobacco and the like.

The invention will be best understood upon reference to the annexed drawings, wherein:

Figure 1 is a side elevation of the machine; Fig. 2 a vertical sectional view on the line 2—2 of Fig. 1, looking toward the rear of the machine; Fig. 3 a similar view on the line 3—3 of Fig. 2 looking toward the right hand side of the machine; Fig. 3ª a sectional perspective view of a portion of the bed, a section of the bag-form turret shaft, the bearing for said shaft, and a portion of the attendant parts, whereby the shaft may be positively rotated and likewise raised and lowered; Fig. 4 a horizontal sectional view on the line 4—4 of Fig. 1; Fig. 4ª a side elevation of the end bunter and actuating mechanism employed therewith for transferring the completed package from the delivery chute or way onto the endless carrying chain; Fig. 5 a horizontal sectional view on the line 5—5 of Fig. 1, the bag-folder being omitted; Fig. 6 a vertical sectional view on the line 6—6 of Fig. 1, looking toward the rear of the machine and showing the main actuating cams in section; Fig. 7 a top plan view of the measuring chambers and their supporting members, parts being broken away to more clearly illustrate the manner of mounting the same; Fig. 8 a perspective view of a portion of one of said chambers and its supporting arm or bracket; Fig. 9 a vertical sectional view on the line 9—9 of Fig. 2, looking toward the right of the machine; Fig. 10 a detail vertical sectional view on the line 10—10 of Fig. 9 of the stamp box or holder; Fig. 11 a detail view of the mechanism employed for returning the package to the tumbler or package-reversing mechanism; Fig. 12 a perspective view of the turrets, the form carrying turret, and the package-carrying turret, with the attendant mechanisms, namely, the form-presenting and discharging devices, the bag-folder, the paste-applying mechanism, and the bag-closing and sealing mechanism; Fig. 12ª a transverse vertical sectional view of the form-discharging tracks, showing one of the forms just as it is detached from the turret; Fig. 13 a vertical sectional view of the mechanism employed for applying paste to the folds of the bag; Fig. 14 a longitudinal sectional view of the form-presenting mechanism, the forms being indicated by dotted lines only; Fig. 15 a transverse sectional view on the line 15—15 of Fig. 14; Fig. 16 a longitudinal sectional view on the line 16—16 of Fig. 15; Fig. 17 a horizontal sectional view on the line 17—17 of Fig. 1, showing the manner of transmitting power to effect a step-by-step movement of the turret shafts; to cause a periodical semi-rotation of the tumbler or package-reversing mechanism, and a feeding of the stamps to a position where they may be grasped by the stamp-presenting devices; Fig. 18 a side elevation of the cam and lever acting therewith which produces the movement of the parts just referred to; Fig. 19 a detail view, partly in section, of the pawl-carrier and toothed collar secured to the form-turret shaft; Fig. 20 a similar view of the same parts; Fig. 21 a side elevation of the stamp-withdrawing and presenting mechanism, the parts being in position where a stamp is just grasped with a view to withdrawing the same from the stamp-box; Fig. 22 a perspective view of said mechanism on a somewhat larger scale, the parts being in the same relative positions; Fig. 23 a side elevation, partly broken away, of the stamp-box or holder and the stamp-withdrawing jaw, said jaw having moved away from the box and the paste-applying roll come into contact with the stamp; Fig. 24 a detail view of a portion of the stamp-box, the clamping jaws and paste roll, showing the relative positions of said parts; Fig. 25 a top plan view of the stamp-presenting mechanism, a stamp (shown in dotted lines) having been fully withdrawn and held in position over the stamp-applying form; Fig. 26 a side elevation showing the parts in the same relations; Fig. 27 an enlarged transverse sectional view on the line 27—27 of Figs. 25 and 26; Fig. 28 a vertical sectional view of a portion of the package-carrying turret, and the bag-folding and indenting mechanism; Fig. 29 a side elevation of the folding and indenting mechanism as viewed at right angles from the position shown in Fig. 28; Fig. 30 a horizontal sectional view on the line 30—30 of Fig. 28; Fig. 31 a similar view on the line 31—31 of Fig. 29; Fig. 32 a perspective view of the package with the initial or side folder moved inwardly relatively to the bag to effect the initial fold in the bag; Fig. 33 a similar view showing the side and two end folders moved inwardly, with the indenting member ready to act or having just completed its operation; Fig. 34 a top plan view of the folding and indenting blades, showing their relation to each other and to the bag when the blades are moved inwardly to their full extent; Fig. 35 a vertical sectional view of the package-presenter or tumbler and the stamp-applying mechanism, illustrating the manner in which the packages move one another in passing through the tumbler and the stamp-applying box or chamber; and Fig. 36 a perspective view of one of the completed packages, partly broken away on one side to show the inner, moisture-proof bag.

The main object of my invention is to produce a compact and efficient machine for the purpose in view, that is, accurately weighing the material to be packed, filling the package, compressing the charge, closing and sealing the package, and, finally, if desired, applying a stamp or band to the package thus closed.

With the particular embodiment of the invention herein shown the machine is especially adapted to the handling of granular or flaky material, such for instance as scrap tobacco or cigar cuttings. In packing tobacco in paper bags, two bags are used, one nested within the other, the inner bag being preferably waterproof.

The essential features of the machine comprise two overlapping turrets or carriers which work in conjunction with each other, one being a form-carrier which presents the form with the bag or bags thereon to the feed hopper and then carries it in line with the underlying package-carrying turret. This second turret, which receives the bag with the compressed charge, then presents said charged bag to folding and closing mechanism, after which the closed package is automatically presented to a previously-pasted and automatically positioned stamp or label which is automatically applied to the infolded end of the package. The packages thus completed are transferred through the action of the machine to a carrier, where they are retained a sufficient length of time to permit the paste employed to become thoroughly dried.

A still further feature of merit in the present machine resides in the means employed for automatically presenting the bag forms, with the bags thereon, to the turret and likewise discharging the empty and stripped forms from the turret and moving the same out of the path of rotation of the turret.

Other features of construction and design which are of material advantage are also present, and will be hereinafter more fully set forth and pointed out.

Referring to the drawings, 1 denotes the bed or table of the machine, supported by suitable inter-connected and braced legs 2 and 2$^a$, secured to the under side thereof, the parts being made sufficiently heavy to render the machine stable and to afford proper support and bearings for the power shafts and the like.

Secured to and extending upwardly from what may be termed the rear of the bed or machine is a column 3, carrying at its upper end a cross-head 4, to which in turn are secured a series of horizontally-disposed arms 5, see Figs. 1, 2, 7 and 8. The outer end of each arm is bifurcated, the inner walls being flat and standing parallel to each other. Each arm (excepting the outermost ones) is provided with a vertically-disposed secondary arm or branch 6, the upper end of which is formed with a head 7, to which are secured by tap bolts or the like the laterally-extending lugs 8 of the measuring chambers 9. Each chamber is likewise provided with a through shaft 10, the ends of which are flattened and rest within the bifurcated ends of the two adjacent arms 5. As will be readily appreciated, any one of the series of measuring chambers may be removed, independently of the others, without affecting the operation of those remaining in position, which is a point of manifest advantage. It is, of course, essential to disconnect the operating mechanism of the measuring chamber from the actuating rod or device before said chamber is removed.

In the present application it has not been deemed necessary to illustrate and describe the measuring mechanism in detail, inasmuch as except as above described, the construction is essentially the same as that shown, described and claimed in Letters Patent granted to Rufus L. Patterson under date of March 15, 1904, and numbered 754,937. Each measuring chamber discharges into a scale-pan 11, which in turn empties into a common hopper 12, the mouth of which stands in line with the form-carrying turret hereinafter referred to. The measuring devices are actuated by rods 13, connected at their lower ends to the outer ends of levers 14, which are raised and lowered by cams 15, mounted on a shaft 16 to which motion is imparted by an intermediate shaft 17 (see Figs. 5 and 6), said shaft receiving its motion from the main cam-shaft 18. The dribble rolls (not shown) are driven through belts 19 and 20, the latter passing about and receiving its motion from a pulley 21, mounted on the main driving shaft 22, see Fig. 3. Said main shaft and the cam shaft 18 are mounted in suitable bearings carried by the supporting frame, and stand parallel to each other, see Figs. 4 and 5. The main shaft 22 is provided with a fly-wheel 23 at one end, and is likewise provided with a clutch member 24, slidably mounted thereon, which works in conjunction with a similar member 25, formed upon the hub of the loose driving pulley 26. The slidable clutch member is actuated through a yoke piece 27, fulcrumed at its upper end to an arm or bracket 28, extending outwardly from the bed or table. A rod 29 connects the lower end of the yoke to an arm 30, said arm in turn being secured to a shaft 31, journaled in brackets 32, 32, Fig. 4, an actuating lever 33 being secured to the opposite end of said shaft and projecting upwardly thereon at the right hand side of the table in easy reach of the attendant who places the forms, with the bags thereon, upon the form-feeding device.

Motion is transmitted from the main shaft to the cam shaft through a pinion 34, mounted on the former, which meshes with a large gear 35 carried by the cam shaft. Secured to said shaft are four cams, designated as 36, 37, 38 and 39. Cam 36 serves primarily to rotate the turrets, to revolve the package tumbler and the stamp-feeder. Cam 37 operates to raise and lower the form-carrying turret; cam 38 actuates the stamp-presenting or positioning mechanism, the side bunter, and also the package-elevator; and cam 39 acts to raise and lower the shaft or column which carries the packer, the folder mechanism, the paste receptacle and the package-removing rod.

The cam shaft 18 has secured to the end adjacent to the left hand side of the machine a bevel gear 40, which meshes with a similar gear 41 secured upon a shaft 42, Figs. 1 and 4, mounted in suitable hangers 43, carried by the supporting member 2. Said shaft 42 likewise carries a cam 44 which in a manner hereinafter set forth actuates the form-withdrawing and presenting devices and also the end bunter.

The bed or table is provided with an opening at approximately the center thereof, and a hollow column or post 45 is secured to the table at this point, the lower end of the column extending into the opening, making a neat fit therewith, while the laterally-extending flange of the column has a fair bearing upon the upper face of the table to which it is bolted, see Figs. 3 and 3ª. A sleeve 46, having a laterally-projecting flange which rests upon the upper end of the column, extends downwardly through the column, the inwardly-projecting portions of said column being bored and dressed so as to afford a smooth bearing for the sleeve. The lower end of said sleeve is reduced and a washer 47 surrounds the upper part of the reduced portion, lying immediately below the lower end of the column and overlapping against the under face of the bed. A gear 48 is splined upon the sleeve while the lower end of the sleeve is provided with a series of pockets 49, which in effect form ratchet teeth, see Figs. 17 and 19. The sleeve immediately above the pockets 49 is formed with an annular groove in which works a pawl-carrier 50, made of two pieces and secured in place as illustrated in Figs. 17 and 20. The upper end of the sleeve is bored out and a bushing 51, having a square opening extending therethrough is shrunk therein. A washer 52 overlies these parts. The lower end of the sleeve is provided with a cylindrical bore, and a shaft 53 (the lower portion of which is cylindrical in cross-section while the upper portion is square) extends through the bushing and sleeve in a manner best illustrated in Fig. 3ª. From this it will be seen that any rotary motion imparted to the sleeve will be transmitted to the shaft, while the latter may be freely moved endwise through the sleeve and bushing.

A lever or arm 54 is fulcrumed between two upstanding lugs 55, formed upon a cross-bar 56, extending from one leg or support to the other. Said arm carries a bowl or roller 57, which stands in line with cam 36, the arm being rocked upon its pivot by reason of engagement of the bowl by the cam as it rotates in the direction indicated by the arrow in Fig. 18. The arm is connected at its upper end by an adjustable link 58 to the pawl-carrier 50, as best shown in Fig. 17. For every complete revolution of the cam 36 the sleeve 46 will be given a quarter turn and as a consequence the shaft 53 will make a quarter revolution.

An arm or lever 59, Figs. 2, 3, 4 and 5, fulcrumed upon a shaft 60, carries a bowl 61 which overlies the cam 37, the outer end of the arm being connected to a link 62 which in turn is connected to a swivel block 63, Fig. 1, mounted in the lower end of shaft 53. Cam 37 is so timed as to elevate the shaft previous to a rotation thereof through the action of cam 36, as just described. The purpose of this will presently appear.

Securely mounted upon the upper end of shaft 53 is a casting or turret 64, provided with four radially-disposed, equally-spaced hoppers or funnels 65, the turret being likewise provided with four depending hollow lugs or hubs 66, spaced midway between the adjacent funnels. The funnels by preference will be formed separately from the turret, as indicated most clearly in Figs. 12 and 15, being provided with laterally-extending flanges which rest upon the upper face of the turret frame or casting, while the lower contracted portion makes a close fit with the walls of ways or recesses formed in the turret frame or casting. Each funnel is provided with two downwardly-extending hooks 67, pressed inwardly at their lower ends toward each other by springs 68, which encircle the pivot-pins of the hooks, see Fig. 16.

The bag-shape or holder 69, shown in section in Fig. 15, comprises a funnel-shaped portion, the opening in the upper end of which is as large as the discharge end of the funnel 65, and a lower portion which in cross-section has the same form as the finished package. In the form shown, the holder is oblong in cross-section. Wings 70 extend out from each side of the funnel or flared upper portion of the shape or holder, said wings serving to support the shapes when they are positioned preparatory to being taken up by the turret after having the bags placed thereon, and also when the holders with the bags stripped therefrom are discharged from the turret. Adjacent to the station designated by 71, Fig. 5, and termed the "feed" or "shape-feed station" (at the left of the machine), and also at the station designated by 72 and termed the "discharge station" are located suitable tracks and actuating mechanisms or devices for positioning and removing the shapes.

At the feed station, Figs. 1, 2, 5, 14 and 15 is provided a fixed back or support 73, sustained by suitable arms secured to the bed or table. 74 designates the movable track or support which stands parallel to the fixed track 73, and is connected to a slide 75, mounted and movable longitudinally in a way formed in the fixed member or guide 76. The movable track, as will be seen upon reference to Fig. 14, is of a length equal to that of two of the funnels of the bag-shapes, and is provided with an upstanding lug or ear 77 which engages a wing 70 and moves the forms with the two superimposed bags thereon inwardly toward the turret, the innermost form being directly positioned beneath the funnel 65, which stands at that time in exact alinement therewith. Each track is provided with a cut-away section or recess 78, which when the movable track reaches its innermost limit stands in line with the hooks or latches 67, said latches riding over the wings 70 as the turret is lowered, and engaging the under face thereof. As the turret rises into the position shown by dotted lines, Fig. 2, the form, with the bags thereon, is raised with it. The form-discharge mechanism is of substantially the same construction, comprising a fixed track 73ª, a movable track 74ª, a slide 75ª, a guide or member 76ª, a lug or ear 77ª placed in this instance at the inner end of the movable track, and recesses 78ª. The tracks and beveled recesses in this instance are so proportioned as to cause the latches to ride from beneath the wings 70 and thus free the form, see Fig. 12ª, when the turret is lowered. The movable track is then moved outwardly, withdrawing the shape from beneath the turret hopper or funnel 65.

To effect the reciprocation of the movable tracks or supports, the following mechanism is employed, particular reference being had to Figs. 1, 2, 3, 4 and 17. Pivotally connected to the lower portion of the supporting member 2 is an arm or lever 79, pin-jointed at its upper end to a lever 80, which in turn is secured to a shaft 81 mounted in suitable brackets carried by the under face of the table. An arm 82 secured upon the shaft extends through an opening in the table and is connected to the movable or reciprocating track 74 through the medium of a link 83. Shaft 81 is provided with a bevel pinion 84 at one end, which pinion meshes with a similar pinion 85 carried by a shaft 86 which stands at right angles to shaft 81, see Fig. 17. Shaft 86 carries an arm 87, which also projects upwardly through an opening formed in the table and is connected to the movable track section 74ª by a link 88. The parts are so timed that the turret 64 moves upwardly to its full extent, carrying with it one of the shapes or bag-forms previously positioned upon the tracks 73, 74, and automatically engaged by the hooks 67, and is then given a quarter turn. As the turret begins its upward travel, the movable tracks or supports are moved outward, track 74 being placed in position to receive another form, and 74ª traveling outwardly with the stripped form, which may be lifted off by the attendant at station 72. Before the turret is again lowered the tracks are moved inwardly, ear 77 pushing the forms inwardly so that the innermost stands directly beneath the hopper 65, which at that moment is in line therewith. The form previously withdrawn by the turret and having the bags thereon,—namely the inner moisture-proof bag 89 and the outer preferably printed bag 90, see Figs. 2, 32 and 36,—is carried beneath the hopper 12, while the turret is still elevated, where it receives its exact charge from the measuring chambers 9 and scale pans 11. As will be noted, the form being filled receives the bulk of its charge while it is elevated; it is then lowered and raised while still in line with the hopper 12, before being moved laterally in line with the packer, which will be hereinafter set forth in detail. The pawl-carrier 50 is designed to advance the turret the proper distance, but to insure the turret coming to rest at each quarter revolution in exact position so that the parts will properly function, a fixed vertically-disposed post 91, Fig. 2, is employed, the upper end of the post being beveled or inclined so that it may readily enter the opening in the lug or hub 66, which at that time stands immediately above it. As the post stands at a distance from the axis of the turret, it will insure an absolute positioning of the parts. A similar arrangement of post and pawl-carrier is set forth in Letters Patent granted to Rufus L. Patterson under date of March 23, 1897, and numbered 579,546.

92 designates a vertically-disposed shaft, see Figs. 2, 5, 9, 12 and 17, the shaft passing through a sleeve 93, which in turn finds its bearing in a hollow post or column 94, secured upon the upper face of the table. Vertical endwise movement is imparted to said shaft 92 by means of cam 39, which acts upon a roller 95 carried by a lever or arm 96 fulcrumed upon shaft 60, the opposite end of said lever being connected to shaft 92 by a link 97. The upper end of shaft 92 carries a spider frame 98, having four radially-disposed arms to which are attached the packer 99, the folder shaft 100, the paste receptacle supporting arm or shaft 101, and the package-ejector 102, all of which will be hereinafter set forth in detail.

The lower end of sleeve 93 carries a bevel pinion 103 and a gear 104, the gear lying immediately above the pinion, both being made fast to the sleeve. As will be seen upon reference to Fig. 17, gear 104 meshes with an idler 104ª, which in turn engages gear 48, and consequently said gear 104 is given a partial revolution every time the pawl-carrier 50 advances shaft 53 and its attendant parts. Sleeve 93 is, therefore, given a step-by-step rotation equal to and in time with the movement of the form-carrying turret. Said sleeve is formed as a downward extension of a turret or casting 105, which may be termed the package-carrying turret. It is provided with four radially-disposed chambers or pockets 106, formed by the vertical walls 107, which are, in the form illustrated, integral parts of the turret casting.

Secured to the upper face of the table 1, beneath the turret 105, is an anvil or support 108, the support extending from a point beneath the packer 99, around nearly to an opening 109 formed in the table in line with the package-ejector 102, see Fig. 12. The anvil or support is curved so that it stands beneath the pockets and the bags carried thereby except when the pocket and contained bag come into line with the ejector, as just noted.

An ironer or closer 110 (see Fig. 12) shown in the form of a sector-shaped plate, is carried upon an arm 111 secured to the table, said ironer extending from the point where the paste is applied to the folded bag to a position where the package is ejected from the turret.

The packer 99, best shown in Fig. 2, is provided with a base of a size just sufficient to pass into the form. The packing of the charge is effected when the bag-shape or form, with the filled bag thereon, is in the position shown in Figs. 2 and 12. At such time the bag and form will be within one of the pockets 106, with the bottom of the package resting fully and squarely upon the anvil or support 108. When the bag and bag-shape have reached this position, shaft 92 is lowered, carrying with it frame 98, and consequently lowering packer 99. After the packer has completed its full stroke, it comes to rest and the form-carrying turret is moved upwardly. Inasmuch as the packer remains stationary, the compressed charge of material and the bag upon which it bears at the bottom will be held against movement, and the shape 69 withdrawn therefrom, leaving the compressed charge in the bag, or nested bags, as the case may be, in the pocket or chamber 106. The form-carrying turret is raised to its highest point of elevation, and the shaft 92 is likewise moved to its uppermost position, the parts at such time occupying the positions shown in dotted lines in Fig. 2. The turrets are then rotated through the action of cams 36 and the connections before described, turret 64 moving so as to bring the stripped and emptied form in line with the discharging mechanism upon which the form is lowered, while turret 105 brings the open-ended filled bag or receptacle beneath the folding and indenting mechanism carried by shaft 100, where it comes to rest. This mechanism is best shown in Figs. 9, 12, 28, 29, 30 and 31. It comprises a side folder or plate 112, pivotally connected adjacent to its outermost edge to the lower end of an arm or lever 113; edge folders 114 and 115, pivoted respectively to the lower ends of levers 116 and 117; and an indenting plate 118, rigidly secured to the lower end of an arm or lever 119. A spring 120 is employed in conjunction with each of the edge folders, said spring being of sufficient strength to give the inner edge of the blade or folder a slight upward inclination so that they will hit the upstanding sides of the bag at a point slightly higher than the blade or side folder 112 when they are moved inwardly. The arms or levers 113, 116 and 117 are pivoted to lugs or ears 121, which project outwardly from the upper end of a sleeve 122, that loosely encircles the lower portion of the shaft 100, the lower end of said shaft being enlarged to prevent the sleeve from sliding off. The sleeve terminates at its lower end in four feet 123, which are so positioned and related that when the folder is pushed down to its limit the feet rest upon the upper edges of the upright parallel walls 107 of the package-carrying turret, see Fig. 29. The feet are, however, given a sufficient spread to permit the folders to pass in between them. The upper end of each lever 113, 115 and 116 is pivotally connected to a link 124, the links at their inner ends carrying pins 125 which work in slots 126 formed in radially projecting arms 127 formed on a casting 128, slidably mounted upon shaft 100. The upper end of lever 119 is beveled and works in conjunction with a cam 129, formed upon the casting, said cam coming into action to throw the indenting or folding blade 118 inwardly after the folders have been operated. A collar 130 is pinned to shaft 100, and a coiled spring 131 is mounted between the collar and the upper end of casting 128.

As will be seen upon reference to Fig. 29, the slot 126 for the side folder lever 113 is provided with an inwardly-extending off-set portion at its lower end, which has the effect of throwing the side folder 112 in over the bag in advance of the inward movement of the edge folders 115 and 116.

When the shaft 100 is elevated the parts stand in the positions shown in full lines in Figs. 1, 9 and 12, and in dotted lines in Figs. 28 and 29, the links 124 and the folder levers coming more nearly into line and thereby throwing the folders outwardly. When the shaft is moved downwardly the feet 123 first come into contact with the walls 107, bringing the sleeve to rest. Continued downward movement of the shaft will cause the casting or frame 128 to be pressed down into the position shown in Figs. 28 and 29, which, as above stated, will force the upper ends of the levers outwardly and the folder blades inwardly, causing the upper end of the bags (or bag) to be folded in the manner illustrated in Figs. 33 and 34.

During the operation of folding, the turrets are at rest and so remain until the folder is raised entirely clear of the package. As soon, however, as this occurs, the turrets move a quarter turn, carrying the folded package having one upstanding side beneath the paste-applying device. This comprises, in the form shown in Figs. 2 and 13, a receptacle or chamber 132, attached to the rod 101 and provided with an oscillating valve 133, which controls the opening 134 formed in the bottom of the receptacle. The valve is provided with a laterally-extending arm or lever 135, which stands in the path of the arms 136 and 137, formed as a part of the upright 138. As the receptacle is moved down into contact with the partially-folded bag, the valve is opened, see full lines Fig. 13; when it is raised the valve is closed, as shown in dotted lines. After the paste or adhesive is applied to the bag, the package (still retained between the upright walls 107 and resting upon the support 108) is carried in beneath the ironer or closing plate 110. The upstanding end is thus turned down upon the adhesive, where it becomes fixed. When the package thus sealed reaches a position over the opening 109 in the table, the ejector 102 descends, pushing the package endwise out of the pocket in the turret 105 and forcing it into the tumbler or package-reversing box 139, see Figs. 2, 9 and 35.

The tumbler is a rectangular box-like member, open from end to end, the opening in cross-section being equal to the outside dimensions of the package, while the ends are flared to more readily admit the entrance of the package into the same. Said tumbler is provided at its midlength with stud axles 140, which find their bearings in brackets 141. One axle carries a bevel gear or pinion 142, which meshes with the similar gear 103 carried by the lower end of the sleeve 93, see Fig. 9. The other axle likewise carries a bevel gear 143, which meshes with a similar gear 144 mounted upon a shaft 145. Said shaft has secured to it a sprocket-wheel 146, a sprocket-chain 147 passing about the wheel and a similar but somewhat smaller wheel 148. This latter wheel is secured upon a shaft 149, which overlies the stamp-containing box 150, and carries a block 151 provided with a yielding face 152, preferably of rubber, which comes into contact with the uppermost stamps and serves to feed the same forward, or in the direction of the tumbler, between a fixed lip 153 formed on the stamp-box or receptacle and a second lip 154 which overlies the other. The stamps are held and fed upwardly against the overhanging lips 155 of the box (see Fig. 10) by a follower 156 pressed upwardly by a weight 157 acting through a lever 158, rod 159, and connecting link 160. A knife 161, which extends down through the uppermost stamps (or labels) prevents the stamps from buckling and permits but one to be fed forward at a time.

As usual, one side of the stamp-box is made removable or hinged, to afford a ready means of replenishing the supply of stamps from time to time. The upper end of said stamp-box lies in a plane slightly lower than the lower end of the tumbler, and stands to one side thereof, see Figs. 9 and 35, while directly below the tumbler is located the stamp-applying mechanism. Said mechanism comprises an open-ended oblong chamber or box-like structure 162, somewhat larger in cross-section than the finished package. Extending across from side to side thereof, immediately adjacent to the upper end is a pair of rollers 163, so adjusted as to be slightly farther apart (measured from their proximate faces) than the width of a finished package. Below said rollers, and mounted upon pins 164, extending inwardly from the sides of the box, is a pair of vertically-disposed brushes 165, which serve to hold the ends of the stamp close against the sides of the package as it is forced downwardly between them. Springs 166 serve to hold the brushes against the package with more or less pressure.

To withdraw a stamp from the stamp-receptacle and hold it in the path of the descending package between the lower end of the tumbler and above rollers 163, the following mechanism is employed, particular reference being had to Figs. 21 to 27 inclusive: Extending inwardly beneath the table and secured to the member 2ª, is an arm or bracket 167, see Figs. 2 and 25, which supports one end of a track or way 168, the opposite end being secured to a second arm 169, best shown in Fig. 3. Said way, as will be seen upon reference to Fig. 25, stands to one side of and parallel to the stamp-applying box 162. Mounted upon the way is a slide or block 170, which is connected to an adjustable link 170ª, pin-jointed at its opposite end to the upper end of a lever 171. Said lever is fulcrumed between lugs 172, extending upwardly from the cross-bar or member 56, and carries a roll which works in the groove or way of cam 38. By reason of the shape of the cam, the slide is moved over and back the full length of the track for each complete revolution of the cam, coming to rest at the left-hand end of the track and remaining in this position while a package is being moved from the tumbler into the stamp-applying mechanism. The slide is provided with a lateral extension 173, upon the end of which is formed the fixed jaw or member 174 of the stamp-grasping device, the upper, movable jaw 175 being fixed upon the outer end of a shaft 176 mounted in lugs 177 extending upwardly from the slide and the lateral extension. Shaft 176 also carries a finger 178, having a reversely-beveled end which works in conjunction with a similarly beveled spring-pressed plunger 179, mounted in a barrel 180 secured to the upper face of the slide 170. When the finger lies above the plunger, the movable jaw is closed upon the fixed jaw and so held; when it lies below the plunger the movable jaw is held in its elevated position.

To effect a change in position of the finger and consequently the movable jaw, shaft 176 is provided with an arm 181, the lower end of which stands in line with the end of a fixed rod 182 secured to the bracket 169, and also in line with a fixed finger 183 carried by the bracket or arm 167. Rod 182 serves to close the jaws when the slide has been moved to the extreme right, the jaws at such time grasping the stamp, which has previously been protruded from the box through the action of the feeding block 151. The jaws remain in such position until the slide nearly reaches its extreme position at the left, when arm 181 comes into contact with finger 183 which shifts said arm, thereby separating the jaws and releasing the stamp, which has meanwhile been drawn over the top of the stamp-applying box or chamber directly below the descending package.

To properly supply the requisite amount of paste or adhesive to the stamp in order to cause it to adhere to the package, suitable automatic mechanism is provided, which works in conjunction with the stamp-presenting mechanism just described. Secured to the lateral projection 173 of the slide is a rack 184, standing parallel to the track 168 and passing freely through a bearing-box 185 attached to and supported by the track. Secured to the upper face of the slide is a cam 186, to which in turn is connected a bar 187 carrying adjacent to its outer end a second cam 188, the cams being reversely inclined, as best shown in Fig. 22. The lower edge of the bar 187 rests in and is supported by a groove or channel formed in the upper face of the bearing-box.

A paste or adhesive receptacle 189 is mounted upon the table, a flexible tube 190 extending downwardly therefrom and terminating in a head or chamber 191. The tube and head are supported by a bracket 192, pivotally connected to an arm 193 which in turn is pivotally connected to the support 2ª. Head 191 is provided with an opening in its lower end, and a paste-applying roll 194 is positioned and held therein by a shaft 195 which serves to prevent any paste from passing out except that carried upon the periphery of the roll. Shaft 195 has secured upon it in line with rack 184 a pinion 196, which under certain conditions engages the rack and causes a rotation of the shaft and paste wheel. The shaft also has swiveled upon its end a vertically-disposed arm 197, which carries a roller 198, said roller standing in line with the cams 186 and 188. When the parts are in the positions shown in Fig. 22, and the jaws have just engaged the protruded end of the stamp at one edge thereof, the roller 198 is upon the highest point of cam 186 and consequently the paste roll is likewise elevated. As the slide is moved to the left or from the full line position, Fig. 24, to the dotted line position, cam 186 will be withdrawn from beneath the roller 198, thereby permitting pinion 196 to engage the rack 184 and at the same time lowering the paste roll 194 so that it comes into contact with the advancing stamp. The roll remains in this position until cam 188 rides under roller 198 and again elevates the parts; meanwhile, the stamp will have paste applied to its whole length.

As the package is forced out of the tumbler 139 by the next package above, see Fig. 35, its folded sealed end comes into contact with the stamp, and being forced downward entirely within the box 162 the stamp is wrapped around the edges thereof, by the action of rolls 163 and brushes 165. Inasmuch as the uppermost package of the two shown in Fig. 35 will of necessity be moved down into the position indicated by dotted lines in said figure, or as shown in full lines, Fig. 11, it becomes necessary to return the package into the tumbler in order that the stamp-withdrawing jaws may pass over to the stamp-box and withdraw another stamp. For this purpose, there is located adjacent to the tumbler a fixed push-plate 199, having a curved surface which is arranged eccentrically to the axis of the tumbler. As will be seen upon reference to Fig. 11, this plate serves to force the package back into the tumbler.

The stamped package is ejected from the stamp-applying box by the next succeeding package which is forced downwardly from the tumbler and passes onto a runway 200, Figs. 2, 3, 4 and 9. The upper end of the runway stands directly below and in line with the lower end of box 162, while the lower end lies in a horizontal plane, as best shown in Fig. 2. The packages pass end on down the runway, being prevented from turning by the upstanding sides. Directly in line with the lower end and adapted to work across the same is a bunter 201, termed the side bunter. Said bunter is moved back and forth across the runway by a rod 202, Figs. 3 and 4, which is connected by a pin to the lower slotted end of a lever 203, fulcrumed upon the under side of the bed, the lever in turn being attached to the arm 171 by a link 204.

The movement of the bunter transfers the packages one at a time to a horizontally-disposed shelf or platform 205, Fig. 4, along which they are moved endwise by an end bunter or pusher 206. Said end bunter has secured to it a rod 207, see Fig. 4ª, to which is attached a slide 208, mounted on and carried by an arm or guide 209. The lower slotted end of an arm or lever 210 secured upon a short shaft 211, mounted in a bracket 212, is pin-jointed to the slide. A second arm 213 is secured upon the opposite end of shaft 211 and extending upwardly is connected by an adjustable link 214 to an arm 215, secured to shaft 81, see Fig. 1. The packages as they are moved off the end of the horizontal shelf or platform 205 pass onto an endless carrier or elevator, comprising a pair of endless sprocket-chains 216, having attached thereto a series of equi-distantly spaced blades 217, the chain passing about sprocket-wheels 218 and 219, and over a guide roller 220, supported upon an arm 22ª, see Fig. 2. The lower sprocket wheel 219 is set to one side of the vertical (as regards the upper wheel) so as to allow the elevator to stand at an angle. Said lower wheel is mounted upon a shaft 222, Figs. 2 and 3, to which a step-by-step rotation is imparted by a ratchet-wheel 223 secured thereto, a pawl-carrier 224, and a link 225, interposed between the pawl-carrier and arm or lever 171.

As the packages are moved endwise of the platform 205 they pass onto the blades 217 and are carried upward to a point within easy reach. From the time the stamp is applied until the package reaches the elevator, the packages are end to end, and the stamps are thus held in place and given sufficient time to dry.

The operation of the machine above described is as follows: Material to be packed is fed into the measuring chambers from any suitable source, and from said chambers it passes into the scale pans 11, which successively discharge into the hopper 12. Meanwhile the attendants, one standing at station 72 (Fig. 5), designated as the shape-discharging station, places the inner bag upon the form and passes the same to the attendant at station 71, where the outer bag is slipped over the inner. The form is then placed upon the tracks 73, 74 and as above set forth is moved inwardly by the lug 77 to a point beneath the form-carrying turret, which is lowered so as to cause the latches 67 to engage the projecting wings upon the form. The turret 64 then rises and when it reaches its highest point of elevation is given a quarter turn so as to bring the hopper 65 with the attached form directly beneath the hopper 12, the scale pans at this time discharging and permitting the exact amount of material to pass through hopper 12, hopper 65 and into the bag-shape. As the form-carrying turret rises, the attendant at station 71 places another form, with the bags thereon, in position to be again fed in beneath the hopper as it is lowered. This is done at each quarter revolution of the turret, so that there will always be one form, with the bags thereon, in position to be engaged by the turret every time it is lowered. The bag receives the greater portion of the charge while the turret is in its elevated position, before the turret moves from in line with the lower end of hopper 12, so that any material which may be discharged therefrom will have sufficient time to be fed into the bag during this lowering and raising movement of the turret previous to its quarter revolution which brings the charged bag-shape form into line with the packer 99.

After the form with the filled bag thereon comes into line with the package-carrying turret 105 the form-carrying turret 64 is lowered and the form and bag pass down between two of the vertically-disposed walls 107, as best shown in Fig. 12, coming to rest upon the anvil or support 108. The packer then descends, compressing the material within the bag, and remains stationary after it has reached the limit of its downward travel, while the form-carrying turret 64 moves upwardly, withdrawing the form from the bag, the material being forced outwardly from the end of the form by reason of the fact that the packer remains stationary. The parts are so proportioned that the charge will be freed from the form before the packer begins its upward movement. It will thus be seen that the measured and compressed charge is placed within the bag while the latter is still held between the walls 107 of turret 105. After the form has cleared the bag and the packer been raised to its highest position, the turret 64 is rotated to such position as will bring the stripped form into line with the shape discharging mechanism hereinbefore referred to. The turret is then lowered and the form automatically released therefrom. As the turret is moved upwardly the form is automatically moved away from beneath the turret to a position where the operator may lift it from the tracks, preparatory to putting a new bag thereon. As the turret 64 is rotated, turret 105 is likewise rotated, bringing the package in line with the folding mechanism hereinbefore described, the operation of which will, it is believed, be readily understood. After the bag is folded and the blades are withdrawn therefrom, the bag is carried to a position directly beneath the paste receptacle 132 and paste is applied to the outer faces of the infolded portions. The turret is then given a further rotation, which carries the package beneath the ironing member 110, which turns down the upstanding flap or end of the bag upon the infolded portions and thus securely seals the bag.

As the completed package passes from beneath the ironer it stands in line with the opening 109. The ejector 102 then descends, forcing the package out of the pocket in turret 105 and into the tumbler 139. Before this is done, however, the stamp-presenting member or block 151 will have protruded the uppermost stamp between the lips 153 and 154 into a position where it may be grasped by the jaws 174, 175. These jaws, as above set forth, are then moved to the left, carrying the stamp to a position directly below the mouth of the tumbler 139, paste meanwhile being applied to the upper face of the stamp by the roll 194. The next descending sealed package which is pushed downwardly by the ejector 102 will force the previously-positioned package in the tumbler 139 downwardly in the manner shown in Fig. 35, the folded end of the completed package coming into contact with the pasted stamp and passing with the stamp between the rollers 163 and brushes 165 mounted in the stamp-applying box, as hereinbefore set forth. The package with the stamp thus applied thereto, will remain within the box until the next succeeding package is forced downwardly into said box. The first package will then be moved out of the stamp-applying box onto the runway 200, passing downwardly thereon into line with the side bunter 201. Said bunter then comes into action and transfers the package edgewise onto a shelf or platform 205. The end bunter 206 is then moved and forces the package endwise along the platform 205, and as will be seen upon reference to Fig. 4, when three of the packages are thus positioned the outermost will be moved between the blades 217 of the elevator. After the package is thus positioned in the elevator, the latter will be moved one step. The package will ultimately be carried to the top of the elevator, it being given a chance to dry before reaching that position, so that it may be handled without loosening the stamp, or unsealing the end of the package.

It is conceivable that many of the details of the machine may be varied without departing from the spirit of the invention. For instance, different stamp-applying and presenting mechanisms may be employed, and instead of driving both turrets from the same cam it is conceivable that separate cams might be used. A separate cam might likewise be employed for actuating the tumbler and its attendant parts. But as these matters fall within the province of the mechanician it is not deemed essential to specifically show and describe such modifications herein.

It is also possible that certain portions of the mechanism may be applicable to the treatment of packages other than bags having one end closed before they are placed in the machine, and the term "bag" should be given a wide significance in those claims where such a scope is permissible. In other words, it will be understood to cover any receptacle adapted for the purpose intended.

Having thus described my invention, what I claim is:

1. In a machine for packaging material, the combination of a turret; means for moving said turret step by step; a hollow bag-form or shape; means carried by the turret for temporarily engaging said bag-form or shape; a second turret adapted and designed to receive a bag with a charge therein from the bag-form; a bag-closing mechanism; and means for moving said second turret to present the bag to said closing mechanism.

2. In a machine for packaging material, the combination of a turret; means for periodically raising and lowering the same; means for rotating said turret step by step when in its raised position; a hollow bag-shape or form carried by the turret; a second turret located in a plane below the first turret; means carried by said turret for receiving a charged bag from the first turret; a bag-closing mechanism; and means for rotating said second turret to bring the charged bag into line with said bag-closing mechanism.

3. In a machine for packaging material, the combination of a form-carrying turret; means for raising and lowering the same; means for rotating said turret step by step while in its raised position; a hollow bag-shape or form carried by said turret; a second turret; means carried by said second turret to receive the bag-form with a bag and contained charge of material; a packer arranged to enter the form and pack the material and to hold the same against movement as the form-carrying turret with the form thereon is elevated; a bag-closing mechanism; and means for rotating said second turret to bring the bag, with the compressed charge therein, beneath said bag-closing mechanism.

4. In a machine for packaging material, the combination of a form-carrying turret; a hollow form carried thereby; means for periodically raising and lowering said turret; a second turret underlying the first turret; means carried by said second turret to receive the form with a bag thereon; and means for compressing the material in the form and holding it against movement as the form is elevated.

5. In a machine for packaging material, the combination of a form-carrying turret; a hollow form; means carried by the turret for engaging the form; means for periodically raising and lowering said turret; means for rotating said turret step by step when in its raised position; means for feeding material to the form; means adapted to receive the form with a bag thereon; means for packing the material within the form and holding it against movement as the turret is raised to withdraw the form from the bag; a bag-closing mechanism; and means for transferring the bag, with the compressed charge therein, to said bag-closing mechanism.

6. In a machine for packaging material, the combination of a turret; means for raising and lowering said turret; means for imparting a partial rotation to the turret when in its raised position; means carried by the turret for engaging a bag-shape or form; and means for automatically disengaging the form from the turret and withdrawing the form therefrom, substantially as described.

7. In a machine for packaging material, the combination of a form-carrying turret; a form; means carried by the turret for engaging said form; and means for automatically disengaging and withdrawing the form from the turret.

8. In a machine for packaging material, the combination of a form-carrying turret; a form; means carried by the turret for engaging said form; and means for automatically presenting said form to the turret in a position to be engaged thereby, substantially as described.

9. In a machine for packaging material, the combination of a turret; a form; means for automatically presenting said form to the turret; and means for automatically withdrawing it from the turret.

10. In a machine for packaging material, the combination of a turret; means for raising and lowering the same; means for imparting a partial rotation to said turret when in its raised position; a form; means carried by the turret for engaging said form; means for automatically presenting said form to the turret in a position to be engaged thereby when the turret is lowered; and means for automatically disengaging the form from the turret and withdrawing the same therefrom.

11. In a machine for packaging material, the combination of a form-carrying turret; a series of funnels carried thereby; means for raising and lowering said turret; means for imparting a partial rotation to said turret when in its raised position; hollow bag forms; means carried by the turret in line with the lower end of each funnel for engaging a form; means for automatically presenting the forms to said engaging means as the turret is lowered; and means for automatically releasing said engaging means and withdrawing the forms from the turret, substantially as described.

12. In a machine for packaging material, the combination of a turret; a series of funnels carried thereby; a hollow bag-shape or form means located adjacent to the lower end of each funnel for engaging a bag-shape or form; means for raising and lowering said turret; means for imparting a partial rotation to said turret while in its elevated position; a bag-shape or form supporting-track located to one side of the turret; means for moving a form resting thereon into position to be engaged by the engaging means carried by the turret; a second track located adjacent to the turret and adapted to receive the form as it is lowered thereon and disengaged from the turret; and means for withdrawing said released form from beneath the turret.

13. In a machine for packaging material, the combination of a turret; a series of funnels carried thereby; a hollow bag-shape or form a pair of spring-actuated hooks located adjacent to the lower end of each funnel; means for raising and lowering the turret; means for imparting a partial rotation to the turret when in its raised position; a fixed track or support at one side of and below the turret; a movable track or support, said tracks being adapted and arranged to support a bag-shape or form and to move said shape or form into line with the hooks carried by the funnel; a second pair of tracks or supports; means for disengaging the hooks from the bag-shape or form when it is lowered upon said second pair of tracks; and means for moving the released form from beneath the turret.

14. In a machine for packaging material, the combination of a turret provided with a series of funnels; a hollow bag-shape or form a pair of inwardly spring-pressed hooks carried by the lower end of each funnel; means for raising and lowering the turret; means for imparting a partial rotation to the turret when in its raised position; a fixed track or support; a movable track or support located parallel thereto, said tracks or supports being adapted and arranged to receive a bag-form, and the movable track being provided with an upstanding lug or ear; means for reciprocating said movable track; a second pair of fixed and movable tracks; means for disengaging the hooks from the form as it is lowered upon said second pair of tracks; an upstanding lug or ear carried by said second movable track; and means for moving said movable track, whereby the disengaged form will be moved from beneath the turret, substantially as described.

15. In a machine for packaging material, the combination of a turret; a series of funnels carried thereby; a hollow bag-shape or form means carried by the turret in line with the lower portion of the funnels for engaging a bag-shape or form; a fixed track 73; a movable track; means carried by said movable track for engaging a bag-shape or form; and means for moving the movable track endwise, whereby a form placed thereon and on said fixed track will be moved inwardly beneath the turret into position to be engaged by the engaging means carried by the turret.

16. In a machine for packaging material, the combination of a bag-shape or form carrying turret; a bag form; means for feeding a measured charge of material to the form and bag carried by said turret; a second turret adapted and designed to receive the bag with its contained charge; means for rotating said second turret step by step; a vertically-disposed shaft; means for raising and lowering said shaft; a packer carried by said shaft; a bag-folding mechanism also carried by the shaft, the folding mechanism coming into action as the bag with its compressed charge is carried by the second turret from beneath the packer to a point beneath said bag-folding mechanism; a paste receptacle also carried by said shaft, the receptacle serving to apply paste to the infolded portions of the bag; an ironer; and means for ejecting the sealed bag from the second turret.

17. In a machine for packaging material, the combination of means for filling a bag with a charge of material; a turret adapted to receive and hold said bag with its contained charge; a shaft extending upwardly in line with the axis of said turret; a packer carried by said shaft; a folding mechanism likewise carried by the shaft; a paste-applying mechanism; an ejector; means for periodically raising and lowering said shaft; and means for imparting a partial rotation to the turret, while said shaft with its attendant parts is in its raised position.

18. In a machine for packaging material, the combination of a mechanism adapted and arranged to place a charge of material within a bag and to close and seal said bag; a tumbler adapted to receive the package thus formed and to turn the same end for end; and a stamp-applying mechanism standing in line with said tumbler.

19. In a machine for packaging material, the combination of means adapted and arranged to place a charge of material within a bag and to close and seal said bag; an open-ended tumbler; means for forcing the sealed package into said tumbler with the sealed end uppermost; a stamp-presenting mechanism for placing a stamp in line with the lower end of the tumbler; and means for rotating said tumbler to bring the sealed end of the package over the stamp and in position to be moved into direct contact therewith.

20. In a machine for packaging material, the combination of means for filling and closing a bag or other receptacle; package-reversing mechanism; means for inserting a package in said mechanism; means for periodically rotating said package-reversing mechanism; and a stamp-presenting mechanism working in line with the lower end of said package-reversing mechanism.

21. In a machine for packaging material, the combination of means for filling and closing a bag or other receptacle; a package-reversing mechanism; means for forcing a sealed package into said mechanism; a stamp-presenting mechanism; and a stamp-applying device located in line with the package-reversing mechanism and below the stamp-presenting mechanism.

22. In a machine for packaging material, the combination of means for filling and closing a bag or other receptacle; a package-reversing mechanism; means for forcing a sealed package into said mechanism; means for periodically rotating said mechanism; a stamp-presenting mechanism working in line with the lower end of the package-reversing mechanism a stamp-applying device located below the stamp-presenting mechanism and in line with the package carried by the reversing mechanism; and means for forcing the package downwardly through the package-reversing mechanism and into the stamp-applying device.

23. In a machine for packaging material, the combination of means for filling and closing a bag or other receptacle; an open-ended tumbler or box; means for forcing a package into said tumbler or box, with the sealed end uppermost; means for periodically imparting to said tumbler a half-revolution; a stamp-applying device located in line with the lower end of said tumbler; and a stamp-presenting mechanism for placing a stamp between the lower end of the tumbler and the upper end of the stamp-applying device, whereby when the package is forced downwardly out of the tumbler it will be brought directly into contact with the stamp and forced into the stamp-applying device, with the stamp thereon, substantially as described.

24. In a machine for packaging material, the combination of means for filling and closing a bag or other receptacle; a tumbler open at its opposite ends and adapted to receive a sealed package with the sealed end uppermost; means for periodically imparting to said tumbler a half revolution; a stamp-applying device; a stamp-presenting mechanism for placing a stamp in line with the descending package as it issues from the tumbler and passes into the stamp-applying device; and means for forcing said package out of the tumbler and into the stamp-applying device, substantially as described.

25. In a machine for packaging material, the combination of means for filling and closing a bag or other receptacle; a package-reversing device comprising an open-ended tumbler; means for turning said tumbler end for end; a stamp-applying device located in line with the lower end of the tumbler; a stamp-presenting mechanism adapted to place a stamp in line with the lower end of the tumbler over the upper end of the stamp-applying device; and means for applying paste to said stamp.

26. In a machine for packaging material, the combination of means for filling and closing a bag or other receptacle; a tumbler comprising an open-ended box; means for turning said tumbler end for end; means for forcing a closed package into and partially through said tumbler; a stamp-applying device located in line with the lower end of the tumbler; stamp-presenting mechanism working in a plane lying between the upper end of the stamp-applying device and the lower end of the tumbler; and means for returning the partially-projected package into the tumbler as the tumbler is rotated, substantially as described.

27. In a machine for packaging material, the combination of a tumbler adapted and designed to receive a filled and closed package; a stamp-applying device; stamp-presenting mechanism for placing a stamp over the upper end of the stamp-applying device; a plunger working downwardly in the tumbler and arranged to force a package into and partially through the tumbler and to thereby project the previously positioned package therefrom; and means for returning the partially projected package into the tumbler as it is rotated, substantially as described.

28. In a machine for packaging material, the combination of a tumbler adapted and designed to receive a filled and closed package; means for rotating said tumbler about a fixed axis; and a plate having a curved surface, said plate being located adjacent to the tumbler with the curve arranged eccentrically to the axis of the tumbler, substantially as described.

29. In a machine for packaging material, the combination of a tumbler adapted and designed to receive a filled and closed package, said tumbler comprising a box-like structure open at its opposite ends; means for forcing a package into said tumbler; means for rotating said tumbler about its axis; and a push-plate 199 located to one side of the tumbler and having a curved surface arranged eccentrically to the axis of rotation of said tumbler.

30. In a machine for packaging material, the combination of means for filling and closing a bag or other receptacle; a tumbler designed to receive said package; means for forcing the package into said tumbler; means for inverting said tumbler with the package therein; a stamp-applying device located in line with the lower end of the tumbler; a stamp-box; means for positioning the uppermost stamp contained within said box; means for withdrawing said stamp from the box and placing it in line with the upper end of the stamp-applying device; and means for applying paste to said stamp as it is withdrawn from the stamp-box.

31. In a machine for packaging material, the combination of means for filling and closing a bag or other receptacle; a tumbler arranged to receive the closed bag; a stamp applying device; means for forcing the package from the tumbler into said device; means for placing a stamp over the upper end of the device in line with the descending package; and an automatically-actuated paste-applying mechanism adapted and arranged to apply paste to the upper face of the stamp as it is placed in position, substantially as described.

32. In a machine for packaging material, the combination of means for filling and closing a bag or other receptacle; a tumbler arranged to receive the closed bag; a stamp-applying device receiving the closed bag from the tumbler; a stamp-presenting mechanism comprising a stamp-containing box, and stamp-grasping mechanism movable toward and from said box and adapted to grasp a stamp, to withdraw the same from the box, and to place it over the stamp-applying device; and means for automatically applying paste to the upper face of said stamp.

33. In a machine for packaging material, the combination of means for filling and closing a bag or other receptacle; a stamp-applying device; means for presenting a package to said device; a stamp-presenting mechanism comprising a stamp-containing box, means for protruding the uppermost stamp from said box, and means movable toward and from said box adapted and arranged to grasp the stamp and to withdraw the same from the box and place it over the stamp-applying device; and means for automatically applying paste to the upper face of said stamp.

34. In a machine for packaging material, the combination of means for filling and closing a bag or other receptacle; a stamp-applying device; a stamp-containing box; a stamp-positioning mechanism movable toward and from said box and adapted to withdraw a stamp therefrom and place the same over the stamp-applying device; and a paste-applying mechanism comprising a roll, a shaft connected to said roll, a pinion carried by the shaft, a rack located in line with the pinion, a roller carried by the shaft, and cams working in line with the roller and serving to raise the pinion clear of the rack when the rack reaches its limit of endwise movement in each direction.

35. In a machine for packaging material, the combination of means for filling and closing a bag or other receptacle; a stamp-applying device; means for presenting a package to said device; a stamp-containing box; means for withdrawing stamps therefrom and placing the same over the stamp-applying device in line with the package which is forced therein; and a paste-applying mechanism comprising a paste receptacle, a flexible tube extending therefrom, a roll working in line with the lower end of the tube, a shaft extending outwardly from said roll, a pinion carried by the shaft, an arm extending upwardly from the shaft and carrying a roller at its outer end, a rack standing in line with said pinion and movable with the stamp-withdrawing means, and cams located respectively at the opposite ends of said rack in line with the roller carried by the arm.

36. In a machine for packaging material, the combination of means for filling and closing a bag or other receptacle; a stamp-applying box; a pair of rollers located in the upper portion of said box, said rollers being adjustable toward and from each other; a pair of brushes mounted in the box below the rollers; springs for normally pressing said brushes inwardly toward each other; means for positioning a stamp above the box; means for applying paste to said stamp; and means for forcing the package downwardly upon the stamp and in between the rollers and brushes, substantially as described.

37. In a machine for packaging material, the combination of means for filling and closing a bag or other receptacle; a stamp-applying device; means for presenting a package to said device; a stamp receptacle; a stamp-presenting mechanism adapted to withdraw stamps from said receptacle and position the same over the stamp-applying device; and a paste-applying mechanism comprising a paste receptacle, a flexible tube extending downwardly from said receptacle, a head or chamber carried by the lower end of said tube, a bracket secured to said head or chamber, an arm pivotally connected to one end of said bracket and a fixed portion of the machine, a paste-applying roll mounted in said head, and means actuated by the stamp-presenting mechanism for raising and lowering said roll, substantially as described.

38. In a machine for packaging material, the combination of a suitable bed; a post or column extending upwardly from the bed in line with an opening formed therein; a rotatable sleeve mounted within said column and held against endwise movement therein; a bushing mounted within the upper end of said sleeve and movable therewith, said bushing being formed with an opening extending throughout its length and polygonal in cross-section; a shaft mounted in said bushing and sleeve, the upper portion of said shaft being polygonal in cross-section and working in the similarly-shaped opening formed in the bushing; means for rotating the sleeve; means for periodically raising and lowering the shaft; a form-carrying turret carried by the upper end of the shaft; a bag shape or form; and a form-presenting mechanism working in conjunction with said turret.

39. In a machine for packaging material, the combination of a suitable bed; a post or column mounted thereon; a sleeve mounted in said post or column; a shaft working in said sleeve and rotatable therewith; a gear carried on the lower end of said sleeve; means for periodically raising and lowering the shaft; means for rotating said sleeve; a form-carrying turret secured to the upper end of the shaft; a series of bag shapes or forms a second post or column extending upwardly from the bed; a sleeve mounted in said post or column; a package-carrying turret secured to and movable with said sleeve; a gear carried by the lower end of said sleeve; an idler interposed between said gear and the gear upon the first-mentioned sleeve; a shaft extending longitudinally through the second-mentioned sleeve; means for periodically raising and lowering said shaft; and package-forming and closing devices carried by said second shaft.

40. In a machine for packaging material, the combination of a suitable bed; a series of bag shapes or forms; a form-carrying turret; a package-carrying turret arranged to receive the package from the forms; a package-reversing mechanism; and connections intermediate said turrets and the reversing mechanism for driving the same in unison from a single source of power, substantially as described.

41. In a machine for packaging material, the combination of a form-carrying turret; a package-carrying turret; a package-reversing mechanism; means for packing material within a bag or other receptacle and closing the same; means for ejecting the package from said package-carrying turret and placing the same within the package-reversing mechanism; a cam for raising and lowering the form-carrying turret; a cam for imparting rotary motion to said turret, to the package-carrying turret, and to the package-reversing mechanism, said parts being directly geared together, substantially as described; and a cam for actuating the packing and closing means.

42. In a machine for packaging material, the combination of means for filling and packing a bag or other receptacle; and a bag-folding device comprising a vertically-movable shaft, a sleeve mounted and slidable upon said shaft, levers pivotally connected to said sleeve, folder blades carried by the lower ends of said levers, a casting mounted upon the shaft above the sleeve, said casting being provided with two vertically-disposed slots and with a third slot having an offset or inclined portion at its lower end, links connected to the upper ends of three of said levers and provided with pins which work within said slots, and a cam carried by the casting in line with the end of the fourth lever, whereby upon the downward movement of the shaft and its attendant parts one folder will be moved inwardly in advance of the others, the side folders then moved inwardly in unison, and the fourth folder or indenter blade be given a quick inward movement by the cam, substantially as described.

43. In a machine for packaging material, the combination of means for filling a bag or other receptacle; and a bag-closing mechanism comprising a vertically-disposed shaft, means for moving said shaft endwise, a sleeve mounted and slidable upon said shaft, said sleeve being provided with feet adapted to rest, when the folder is lowered, upon a fixed portion of the machine, a series of levers pivotally connected to the upper end of said sleeve, folder blades carried by the lower ends of said levers, a casting provided with laterally-extending arms, a pair of the oppositely-disposed arms being provided with vertical slots while a third arm has an inwardly-inclined slot in its lower end, links connected to the upper ends of three of said levers, pins working in said slots and connected to the inner ends of the links, a cam carried by the casting in line with the upper end of the fourth lever, and a spring interposed between the upper end of the casting and a fixed collar secured to the shaft.

44. In a machine for packaging material, the combination of means for folding and closing a bag or other receptacle; means for applying a stamp thereto; a runway located in line with said stamp-applying means and adapted and designed to receive a package as it is removed therefrom; a shelf or platform located to one side of said runway; a bunter moving across the end of the runway to transfer packages from said runway to the shelf; a bunter adapted to move the packages along the shelf; and an endless carrier for receiving the packages as they are moved off the shelf.

45. In a machine for packaging material, the combination of a rotary and vertically-movable turret; means for raising and lowering the same; a series of bag shapes or forms; means carried by said turret for engaging said bag-shapes or forms; a second rotary turret; and means carried by said second turret to receive packages from the first turret as the same is moved downwardly.

46. In a machine for packaging material, the combination of a rotary and vertically-movable turret; means for raising and lowering the turret; a series of equally-spaced devices carried by the turret for engaging bag-shapes or forms; a series of such shapes or forms; a second turret lying below the first turret; a series of equidistantly-spaced package-receiving devices carried by said second turret; and means for periodically rotating the turrets, said means acting to bring one of the bag-shape-engaging devices into alinement with one of the package-receiving devices when the turrets are at rest.

47. In a machine for packaging material, the combination of a package-receiving turret; an overlapping form-carrying turret; a form or shape carried thereby; means for imparting a uniform step-by-step rotation to said turrets; and means for forcing packages from the form turret into the receiving turret.

48. In a machine for packaging material, the combination of a package-receiving turret; an overlapping form-carrying turret; a form or shape carried thereby; means for imparting a uniform step-by-step rotation to said turrets; means for raising and lowering the form-carrying turret toward and from the package-receiving turret; a shaft standing in line with the axis of the package-receiving turret; a packer and a bag-closing device carried by the shaft; and means for raising and lowering said shaft.

49. In a machine for packaging material, the combination of means adapted and arranged to place a charge of material within a bag and to close said bag; an open-ended tumbler; means for forcing the closed package into said tumbler with the infolded end uppermost; stamp-presenting mechanism for placing a stamp in line with the lower end of the tumbler; and means for rotating said tumbler to bring the infolded end of the package over the stamp and in position to be moved into direct contact therewith.

50. In a machine for packaging material, the combination of means for filling and closing a bag or other receptacle; a tumbler open at its opposite ends and adapted to receive a package with its closed end uppermost; means for periodically imparting to said tumbler a half revolution; a stamp-applying device; a stamp-presenting mechanism for placing a stamp in line with the descending package as it issues from the tumbler and passes into the stamp-applying device; and means for forcing said package out of the tumbler and into the stamp-applying device, substantially as described.

In testimony whereof I have signed my name to this specification in the presence of two subscribing witnesses.

GEORGE AUBREY LEE.

Witnesses:
WM. DEATS,
GEO. EICHEMEYER.